United States Patent
Barroso et al.

(10) Patent No.: US 6,925,537 B2
(45) Date of Patent: Aug. 2, 2005

(54) MULTIPROCESSOR CACHE COHERENCE SYSTEM AND METHOD IN WHICH PROCESSOR NODES AND INPUT/OUTPUT NODES ARE EQUAL PARTICIPANTS

(75) Inventors: Luiz A. Barroso, Mountain View, CA (US); Kourosh Gharachorloo, Menlo Park, CA (US); Andreas Nowatzyk, San Jose, CA (US); Mosur K. Ravishankar, Mountain View, CA (US); Robert J. Stets, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 5 days.

(21) Appl. No.: 10/698,130

(22) Filed: Oct. 31, 2003

(65) Prior Publication Data

US 2004/0148472 A1 Jul. 29, 2004

Related U.S. Application Data

(63) Continuation of application No. 09/878,984, filed on Jun. 11, 2001, now Pat. No. 6,675,265.

(51) Int. Cl.$^7$ .............................................. G06F 12/00
(52) U.S. Cl. ...................... 711/141; 711/142; 711/143; 711/144; 711/145; 711/146
(58) Field of Search .......................... 711/141–146, 147, 711/117, 118

(56) References Cited

U.S. PATENT DOCUMENTS

| | | | |
|---|---|---|---|
| 5,634,110 A | * | 5/1997 | Laudon et al. ............... 711/145 |
| 5,963,975 A | | 10/1999 | Boyle et al. |
| 6,263,403 B1 | | 7/2001 | Traynor |
| 6,438,653 B1 | | 8/2002 | Akashi et al. |
| 6,493,809 B1 | | 12/2002 | Safranek et al. |
| 6,738,868 B2 | * | 5/2004 | Gharachorloo et al. ..... 711/141 |
| 6,751,710 B2 | * | 6/2004 | Gharachorloo et al. ..... 711/141 |
| 6,751,721 B1 | * | 6/2004 | Webb et al. .................. 712/10 |
| 6,772,298 B2 | * | 8/2004 | Khare et al. ................ 711/141 |

* cited by examiner

*Primary Examiner*—T Nguyen

(57) ABSTRACT

A computer system has a plurality of processor nodes and a plurality of input/output nodes. Each processor node includes a multiplicity of processor cores, an interface to a local memory system and a protocol engine implementing a predefined cache coherence protocol. Each processor core has an associated memory cache for caching memory lines of information. Each input/output node includes no processor cores, an input/output interface for interfacing to an input/output bus or input/output device, a memory cache for caching memory lines of information and an interface to a local memory subsystem. The local memory subsystem of each processor node and input/output node stores a multiplicity of memory lines of information. The protocol engine of each processor node and input/output node implements the same predefined cache coherence protocol.

6 Claims, 25 Drawing Sheets

Microcode Instruction Format

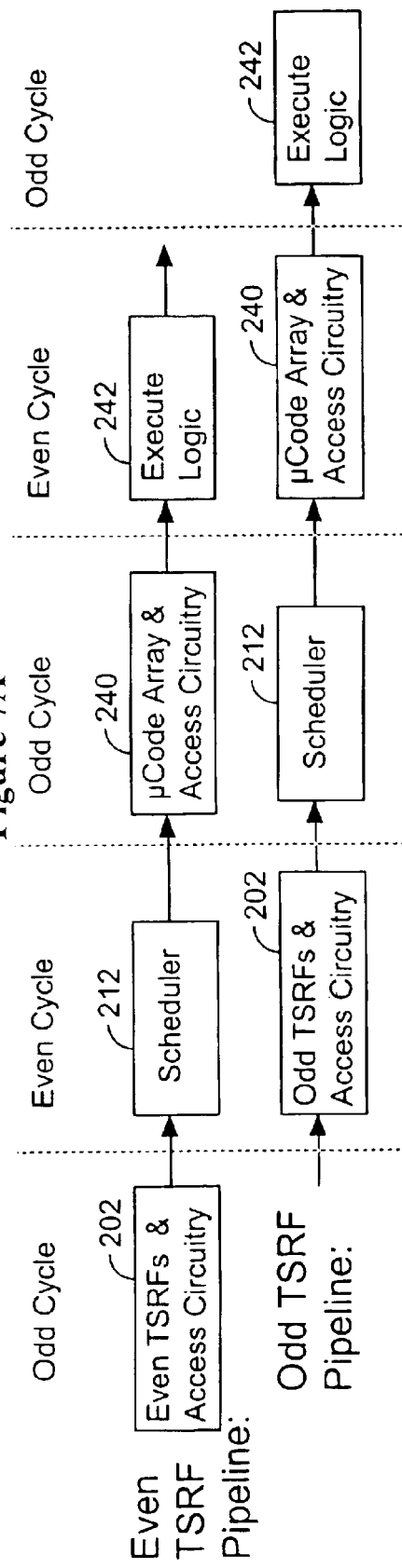

For Direct Mapped L1 Cache:
Address Bit Groups = ABCD
Line Address = ABC
Tag = A
Cache Index for Line = BC
State = invalid, shared, clean_exclusive, dirty_exclusive For 2-way Set Associative Cache:
Address Bit Groups = ABCD
Line Address = ABC
Tag = AB
Cache Index for Line = C

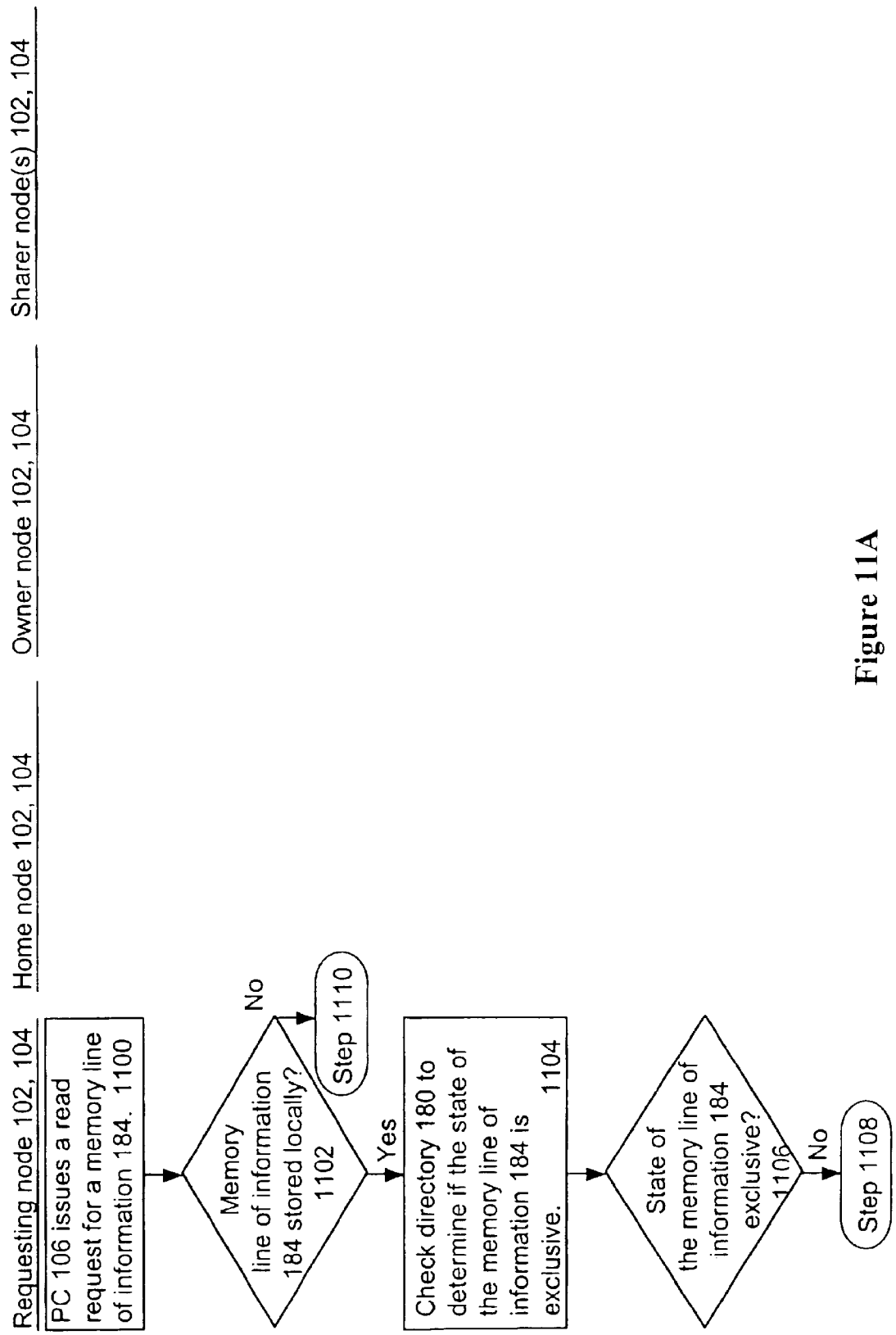

MULTIPROCESSOR CACHE COHERENCE SYSTEM AND METHOD IN WHICH PROCESSOR NODES AND INPUT/OUTPUT NODES ARE EQUAL PARTICIPANTS

RELATED APPLICATIONS

This application is a continuation of U.S. application Ser. No. 09/878,984, filed Jun. 11, 2001 now U.S. Pat. No. 6,675,265, and entitled "Multiprocessor Cache Coherence System And Method in Which Processor Nodes And Input/Output Nodes Are Equal Participants."

This application is related to, and hereby incorporates by reference, the following U.S. patent applications:

Scalable Multiprocessor System And Cache Coherence Method, filed Jun. 11, 2001, Ser. No. 09/878,982.

System And method for Daisy Chaining Cache Invalidation Requests In A Shared-Memory Multiprocessor System, filed Jun. 11, 2001, Ser. No. 09/878,985.

Cache Coherence Protocol Engine And Method For Processing Memory Transaction In Distinct Address Subsets During Interleaved Time Periods In A Multiprocessor System, filed Jun. 11, 2001, Ser. No. 09/878,983.

The present invention relates generally to multiprocessor computer system, and particularly to a multiprocessor system designed to be highly scalable, using efficient cache coherence logic and methodologies.

BACKGROUND OF THE INVENTION

Distributed shared memory (DSM) multiprocessor systems are typically designed with either a special interconnect for input/output traffic or a special bridge that connects input/output modules directly or indirectly to the primary interconnect of the system. Input/output modules may be integrated into each node of the system and thus may use the node structures to ultimately reach the system interconnect when necessary.

The result is that the input/output configuration in conventional DSM systems is typically very limited and inflexible. Designs based on a special input/output traffic interconnect suffer from redundant resources (one interconnect for input/output and one for data), which may be underutilized. Designs based on special bridges typically treat each input/output module as subordinate to a processor, and so the number of input/output modules can not be increased without a corresponding, costly increase in the number of processors.

It would be desirable to have a multi-node multiprocessor computer system that is more flexible with respect to input/output configurations, preferably allowing the number of input/output modules to be increased or decreased without regard to the number of processors in the system, while also unifying the data and input/output interconnects.

It would furthermore be desirable to have a multiprocessor system in which input/output modules and processors are treated as being participants in the general system interconnect and in the cache coherency mechanism. In such a system there would be no need for a special input/output interconnect or bridge, because the input/output modules would communicate data requests and data modifications to the rest of the system via the normal protocol of the cache coherence mechanism. Such a system would furthermore be capable of being configured with an arbitrary ratio of input/output modules and processors.

SUMMARY OF THE INVENTION

In summary, a computer system has a plurality of processor nodes and a plurality of input/output nodes. Each processor node includes one or more processor cores, an interface to a local memory subsystem and a protocol engine implementing a predefined cache coherence protocol. Each processor core has an associated memory cache for caching memory lines of information. Each input/output node includes no processor cores, an input/output interface for interfacing to an input/output bus or input/output device, a memory cache for caching memory lines of information and an interface to a local memory subsystem. The local memory subsystem of each processor node and input/output node stores a multiplicity of memory lines of information. The protocol engine of each processor node and input/output node implements the same predefined cache coherence protocol.

In another aspect of the invention, the protocol engine of each of the processor nodes enables the processor cores therein to access memory lines of information stored in the local memory subsystem and memory lines of information stored in the memory cache of any of the processor nodes and input/output nodes, and maintains cache coherence between memory lines of information cached in the memory caches of the processor nodes and memory lines of information cached in the memory caches of the input/output nodes. Similarly the protocol engine of each of the input/output nodes enables an input/output device coupled to the input/output interface of the input/output node to access memory lines of information stored in the local memory subsystem and memory lines of information stored in the memory cache of any of the processor nodes and input/output nodes, and maintains cache coherence between memory lines of information cached in the memory caches of the processor nodes and memory lines of information cached in the memory caches of the input/output nodes.

In another aspect of the invention, the system is reconfigurable so as to include any ratio of processor node to input/output nodes so long as a total number of processor nodes and input/output nodes does not exceed a predefined maximum number of nodes.

In yet another aspect of the invention, the protocol engine of each of the processor nodes is functionally identical to the protocol engine of each of the input/output nodes.

BRIEF DESCRIPTION OF THE DRAWINGS

Additional objects and features of the invention will be more readily apparent from the following detailed description and appended claims when taken in conjunction with the drawings, in which:

FIG. 7A is a table indicating operations performed during Even and Odd cycles of the execution unit of the protocol engine; FIG. 7B depicts Even and Odd logical pipelines in the protocol engine that share use of many circuitry components.

FIGS. 11A, 11B, 11C, 11D and 11E illustrate the exchange of protocol messages in the course of a read request.

DESCRIPTION OF THE PREFERRED EMBODIMENTS

All specific quantities (such as numbers of processors, number of nodes, memory sizes, bit sizes of data structures, operating speeds of components, number of interfaces, number of memory locations in buffers, numbers of cache lines), as well as the sizes and number of components in various data structures, disclosed in this document, are provided solely for purposes of explaining the operation of one particular embodiment. These quantities will typically vary, sometimes significantly, from one implementation of the invention to another.

The following is a list of abbreviations frequently used in the descriptions below:

CCP: cache coherence protocol;
FSM: finite state machine;
HPE: home protocol engine;
ICS: intra-chip switch;
I/O: input/output;
MC: memory controller;
PC: processor core;
RPE: remote protocol engine; and
TSRF: Transient State Register File.

Figure 1:
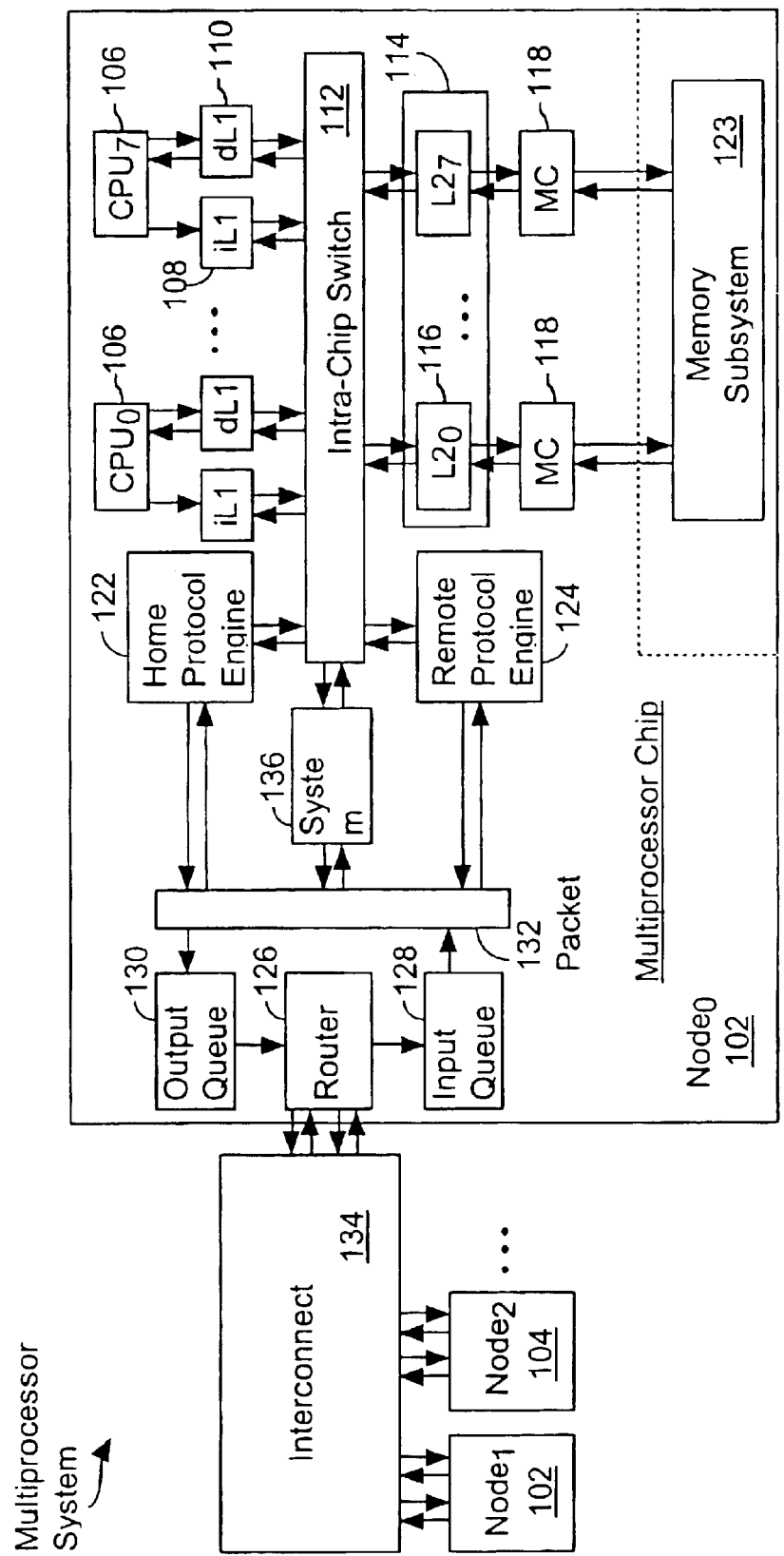
FIG. 1 is a block diagram of a multiprocessor system.

Referring to FIG. 1, there is shown a multiprocessor system 100 including a multiplicity of processor nodes 102 and an I/O nodes 104. Each processor node 102 is preferably implemented as a single chip multiprocessor. In a preferred embodiment, each processor node 102 has eight processor cores (PC) 106; however, other embodiments have two to sixteen PCs 106. The PCs 106, which may be comprised of a central processing unit, are processor cores since their caches, cache coherence logic and other supporting circuitry are shown separately.

Each processor core (PC) 106 is directly connected to dedicated instruction cache (iL1) 108 and data cache (dL1) 110 modules. These first-level caches (L1 cache modules) 108, 110 interface to other modules through an intra-chip switch (ICS) 112. Also connected to the ICS 112 is a logically shared second level cache (L2) 114 that is interleaved into eight separate modules 116, each with its own controller, on-chip tag, and data storage. Coupled to each L2 cache 116 is a memory controller (MC) 118 that preferably interfaces directly to a memory bank of DRAM (dynamic random access memory) chips (not shown) in a memory subsystem 123. In a preferred embodiment, each memory bank provides a bandwidth of 1.6_GB/sec, leading to an aggregate bandwidth of 12.8 GB/sec. Also connected to the ICS 112 are two protocol engines, the Home Protocol Engine (HPE) 122 and the Remote Protocol Engine (RPE) 124, which support shared memory across multiple nodes 102, 104 of the system. Multiple nodes are linked by a subsystem including a router (RT) 126, an input queue (IQ) 128, an output queue (OQ) 130, a packet switch (PS) 132, and a packet switched interconnect 134. The router 126 sends and receives packets to and from other nodes via the interconnect 134. The interconnect 134 physically links multiple nodes 102, 104. In a preferred embodiment$_1$ the total interconnect bandwidth (in/out) for each node is 32 GB/sec. Finally, a system control (SC) module 136 takes care of miscellaneous maintenance-related functions (e.g., system configuration, initialization, interrupt distribution, exception handling, performance monitoring).

In a preferred embodiment, the various modules communicate exclusively through the connections shown in FIG. 1, which also represent the actual signal connections. This modular approach leads to a strict hierarchical decomposition of the single chip used to implement each node of the system, which allows for the development of each module in relative isolation along with well defined transactional interfaces and clock domains. While each processor node 102 uses a complete multiprocessor system on a chip, the processor nodes 102 do not have any I/O capability in this embodiment.

Figure 2:
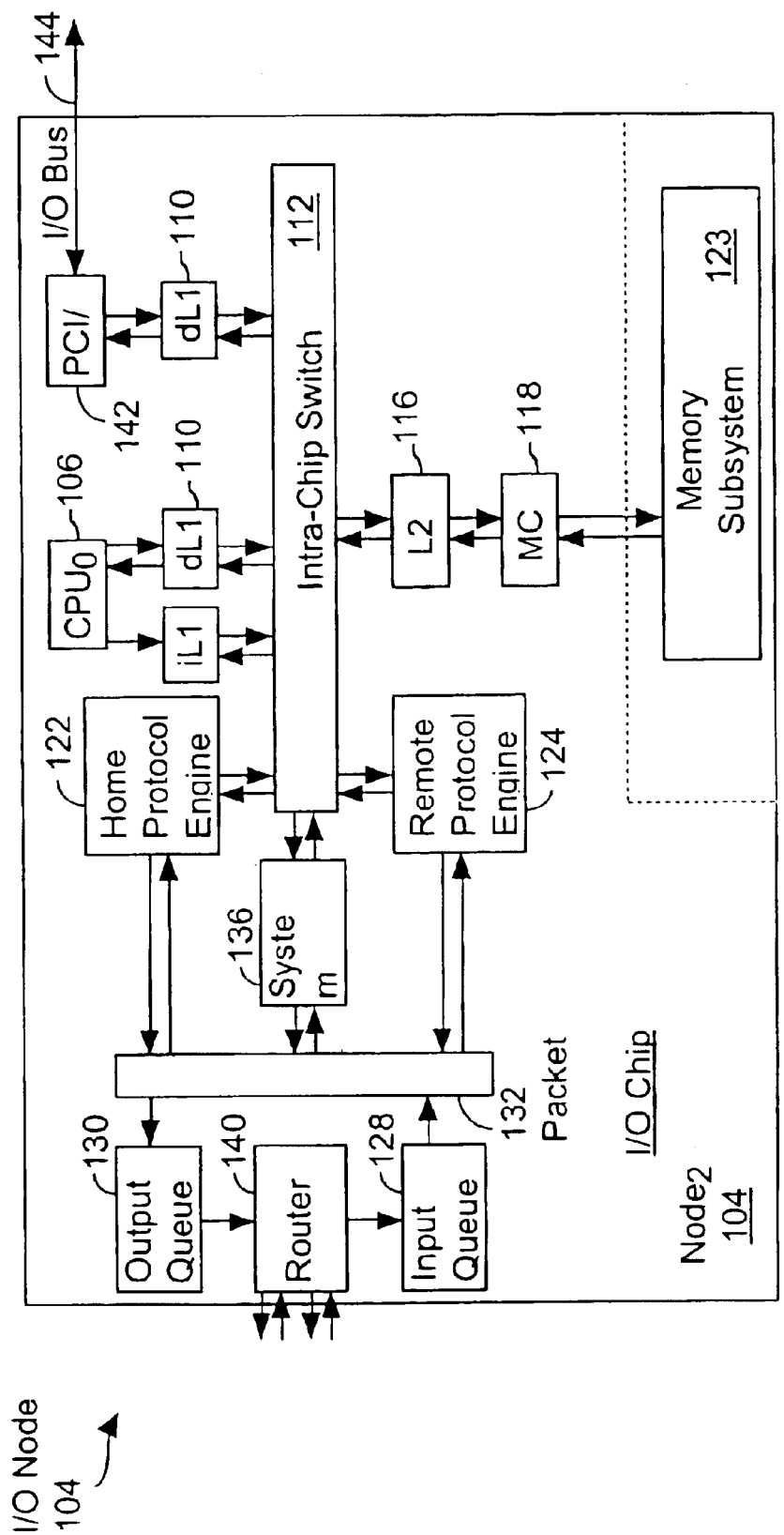
FIG. 2 is a block diagram of an input (I/O) node of the multiprocessor system of FIG. 1.

Instead, I/O is performed by I/O nodes 104, one of which is shown in FIG. 2. Each I/O node 104 is preferably implemented as a single chip that is relatively small in area compared to the chip used to implement the processor nodes 102. Each I/O node 104 is a stripped-down version of the processor node 102 having only one PC 106, one L2 cache 116 and one memory controller module 118. The router 140 on the I/O node 104 is a simplified version of router 126 having support for only two links instead of four, thus eliminating the need for a routing table. The I/O node 104 includes an I/O interface 142, called the PCI/X interface in a preferred embodiment because it provides an interface between a PCI bus and an I/O bus 144.

From the point of view of a programmer, the PC 106 on the I/O node 104 is indistinguishable from a PC 106 included on the processor node 102. Similarly, memory at the I/O node 104 fully participates in the global cache coherence scheme of the multiprocessor system 100 (FIG. 1). The presence of a PC 106 on the I/O node 104 provides several benefits. For instance, it enables optimizations such as scheduling device drivers on this processor for lower latency access to I/O, or virtualization of the interface to various I/O devices (e.g., by having the PC 106 interpret accesses to virtual control registers). Except for the PCI/X interface 142, most of the modules on the I/O node 104 are identical in design to those on the processor node 102. For example, the same first-level data cache module (dL1) 110 that is used with the PCs 106 is also used to interface to the PCI/X module 142. The dL1 module 110 also provides the PCI/X interface 142 with address translation, access to I/O space registers, and interrupt generation. The I/O node 104 may also be customized to support other I/O standards such as Fiber Channel and System I/O.

Referring back to FIG. 1, the multiprocessor system 100 in a preferred embodiment allows for glueless scaling up to 1023 nodes 102, 104, with an arbitrary ratio of I/O nodes 104 to processing nodes 102. The ratio of I/O nodes 104 to processor nodes 102 is adjustable to match the resource needs of any particular workload. Furthermore, the router 126, 140 in each of the nodes 102, 104 supports arbitrary network topologies and allows for dynamic reconfigurability.

The I/O nodes 104 of the system are treated the same as processor nodes 102, that is, as full-fledged members of the multiprocessor system 100. In part, this design decision is based on the observation that available inter-chip bandwidth is best invested in a single switching fabric that forms a global resource utilized for both memory and I/O traffic.

In an alternate embodiment, one or more of the I/O nodes 104 of the system have no processor cores and therefore no L1 caches other than the L1 cache for the interface 142 to an I/O bus or device. Furthermore, a first subset of the no-processor core versions of I/O nodes 104 may also lack a memory subsystem 123, while other ones of the no-processor core versions of the I/O nodes do include a memory subsystem 123.

Processor Core and First-Level Caches

In a preferred embodiment, the PC 106 uses a single-issue, in-order design capable of executing the Alpha instruction set. It consists of a 500 MHz pipelined datapath with hardware support for floating-point operations. The pipeline has 8 stages: instruction fetch, register-read, ALU 1 through 5, and write-back. The 5-stage ALU supports pipelined floating-point and multiply instructions. However, most instructions execute in a single cycle. The PC 106 includes several performance enhancing features including a branch target buffer, pre-compute logic for branch conditions, and a fully bypassed datapath. The PC 106 interfaces with separate first-level instruction and data caches designed for single-cycle latency.

As will be described in more detail below, the system uses 64 KB two-way set-associative, blocking caches with virtual indices and physical tags. The L1 cache modules 108, 110 include tag compare logic, instruction and data translation lookaside buffers (TLBs) (each storing 256 entries, in a 4-way associative caching arrangement), and a store buffer (data cache only). The L1 cache modules 108, 110 also maintains a 2-bit state field per cache line, corresponding to the four states in a typical MESI protocol. For simplicity, the L1 instruction cache modules 108 and L1 data cache modules 110 use virtually the same design. Therefore, unlike other Alpha implementations, the instruction cache is kept coherent by hardware. Treating all cache modules 108, 110 in the same way also simplifies the implementation of a no-inclusion policy at the L2 level.

Intra-Chip Switch

Figure 3:
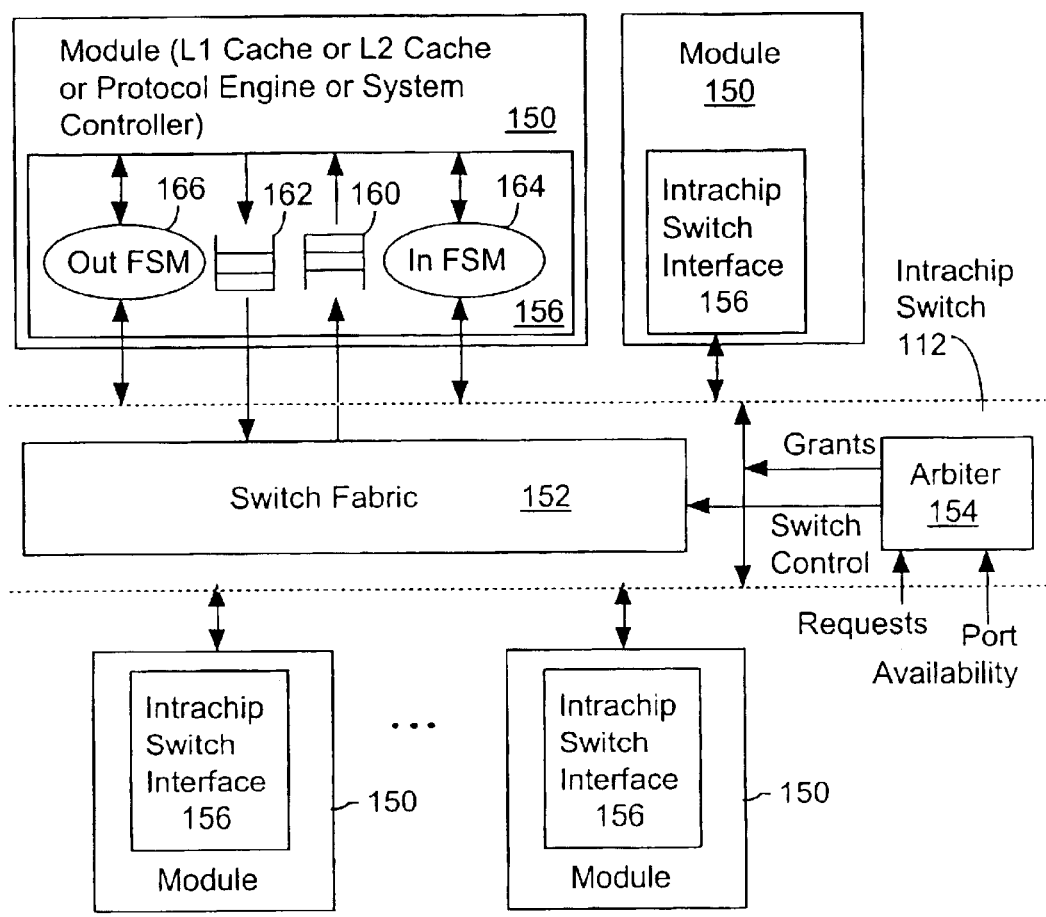
FIG. 3 is a block diagram of a intra-chip switch and the module interfaces used to couple the modules of a system node to the intra-chip switch.

Referring to FIG. 3, conceptually, the ICS 112 is a crossbar that inter-connects most of the modules 150 on a processor node 102 or I/O node 104. The ICS 112 includes a switch fabric 152 and an arbiter 154 for determining which data transfer(s) to handle during each available data transfer period. The length of the data period depends on the number of transfers required to send one cache line across the ICS 112. In a preferred embodiment, each connection provided by the switch fabric 152 of the ICS 112 has a path width of 64 data bits, plus eight parity bits, for a total of 72 bits. Each cache line transported through the ICS 112 has 512 bits of data and sixty-four parity bits. Memory lines are transported along with the corresponding sixty-four parity bits when they are transported through the ICS 112. Parity bits for memory lines are also sent to and used in the L1 cache arrays. However, parity bits are not used in the L2 cache and they are also not used in main memory. Instead, in the L2 cache, 20 ECC bits are associated with each memory line, and more specifically a 10-bit ECC is associated with each 256-bit half memory line. In the L2 cache and main memory, the 64 bits otherwise available for use as parity bits are used instead to store the 20 ECC bits, as well as a 44-bit directory entry, which will be described in more detail below. Data transfers generally are sent with a command or transaction type indicator, which is transferred in parallel with the first 64 bits of data of the cache line. Each cache line sized data transfer requires eight clock cycles, with 64 bits of data and a proportional share of the parity and ECC bits being transferred during each clock cycle.

Arbitration and flow control are handled by the arbiter 154. To better understand the arbiter it is helpful to first review the interface 156 presented by each module 150 (i.e., L1 cache modules 108, 110, L2 cache, protocol engine or system controller) to the ICS 112. As shown in FIG. 3, the standard intra-chip interface 156 provided by each such module includes one or more input buffers 160, one or more output buffers 162, a first finite state machine (FSM) 164 for controlling use of the input buffer(s) 160, and a second finite state machine (FSM) 166 for controlling use of the output buffer(s) 162. The arbiter 154, via the FSM 164, 166 of each module 150 keeps track of the availability of buffer space in the output buffers 162 of the modules 150 at all times, and exercises flow control by deferring requests to transfer data to modules with full input buffers 160. The arbiter 154 also receives all intra-chip data transfer requests from the interfaces 156 of the modules 150, and arbitrates between the requests whose destinations have input buffers 160 with sufficient room to receive a data transfer (i.e., a cache line of data).

In a preferred embodiment three parallel communication lanes, also called queues, are implemented in the input buffers 160 and output buffers 162 of the ICS interface 156, as well as in the input and output buffers of interfaces (not shown) to the packet switch 126 and interconnect 134 (see FIG. 1). These lanes or queues are labeled I/O, low priority and high priority, respectively. The high priority queues in the input and output buffers are used to store messages sent from a home node to another node of the system, replies from third party nodes to the home node or the requester node for a particular transaction, and messages internal to a node. The low priority queues are used to store messages going to the home node for a particular transaction. The low priority message are thus messages for initiating new memory transactions, while the high priority messages are messages for completing previously initiated memory transactions. The I/O queues are used for handling requests being sent to I/O devices. The messages in the I/O queues are given the lowest priority by the intrachip switch 112 and also by the packet switch 126 and interconnect 134 (see FIG. 1).

The use of multiple communication lanes generally increases the size of the input and output buffers in the interfaces to the ICS 112, packet switch 126 and interconnect 134. However, the use of multiple communication lanes is important for avoid deadlock conditions in the network, and in particular for ensuring that active memory transactions make forward progress even when the system is experiencing high levels of protocol message traffic. In alternate embodiments, four or more communication lanes are used instead of three. In particular, in one alternate embodiment the high priority lane is replaced by two separate communication lanes, one for messages sent from the home node of a memory transaction and the other for replies sent by third parties to either the home node or any other node in the system. Providing the additional communication lane helps to ensure that messages sent by the home nodes of transactions are not blocked by reply messages being sent by the same node(s) for transactions in which those nodes are not the home node, and vice versa.

From a philosophical viewpoint, the ICS 112 is the primary facility for decomposing the processor node 102 and I/O node 104 into relatively independent, isolated modules 150. For instance, the transactional nature of the ICS 112 and the uniformity of the interfaces 156 presented by the modules 150 to the ICS 112 together allow different types of modules 150 to have different numbers of internal pipeline stages for handling various type of memory transactions.

The ICS 112 uses a unidirectional, push-only data transfer technique. The initiator of a memory transaction always sources data. If the destination of a transaction is ready, the arbiter 154 schedules the data transfer according to datapath availability. A grant is issued by the arbiter 154 to the initiator of the transaction to commence the data transfer at a rate of one 64-bit word per cycle without any further flow control. Concurrently, the destination receives a signal from the arbiter 154 that identifies the initiator and the type of transfer. Transfers across the ICS 112 are atomic operations.

Each port to the ICS 112 consists of two independent 64-bit data paths (plus additional datapath bits for eight parity bits) for sending and receiving data. The ICS 112 supports back-to-back transfers without dead-cycles between transfers. In order to reduce latency, in a preferred embodiment the modules 150 are allowed to issue a "pre-request" indicating the target destination of a future request, ahead of the actual transfer request. The pre-request is used by the ICS 112 to pre-allocate data paths and to speculatively assert a grant signal to the requester.

Directory Used in Cache Coherence Protocol

Figure 4:
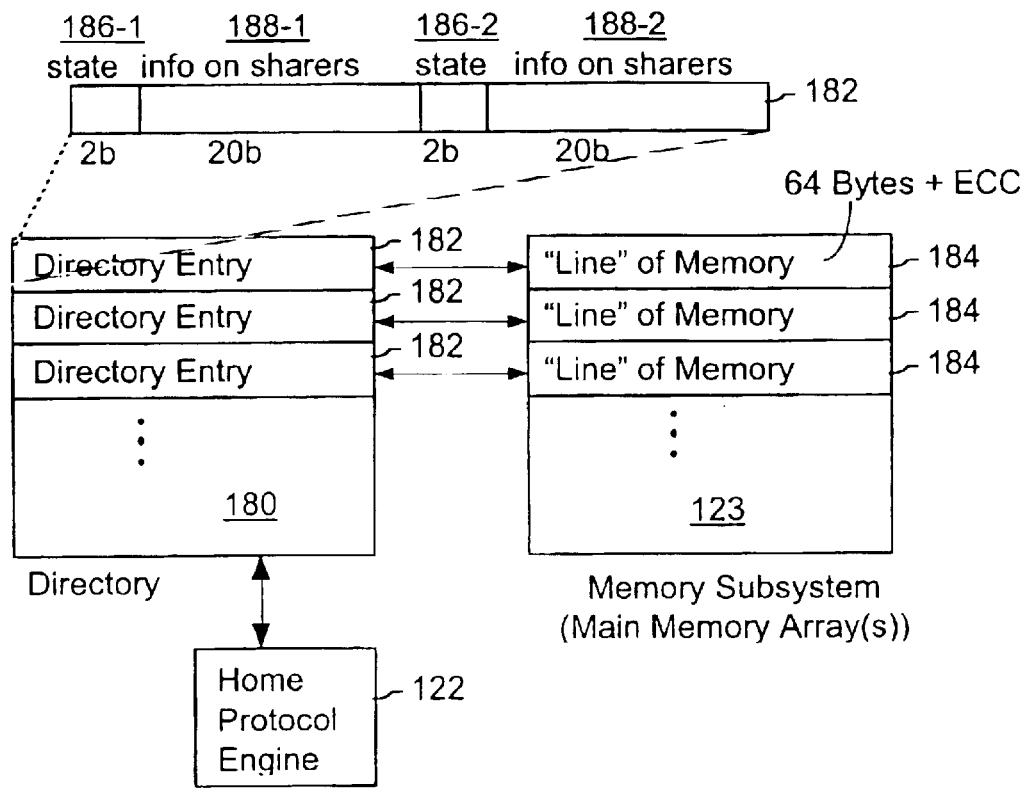
FIG. 4 depicts a directory data structure for keeping track of which nodes of the system have copies of each line of memory data.

Referring to FIG. 4, within each node of the system that has a memory subsystem 123, a cache state directory 180 is maintained by the home protocol engine (HPE) 122. The memory subsystem 123 of a node is also called the main memory array of the node. The directory 180 for a node's memory subsystem 123 includes one directory entry 182 for each "memory line" 184 in the memory system 123. A "memory line" is the unit of memory that fits into one cache line of the L1 cache modules 108, 110 and L2 caches 114. In a preferred embodiment, a memory line is 512 bits (64 bytes, or eight 64-bit words) of data; however, the size of the memory line will vary from one implementation to another. Each memory line 184 also includes two 10-bit ECC (error correction code) codes (one for each half memory line). The 20 bits of ECC codes and the 44-bit directory entry 182 occupy the same amount of memory, 64 bits, as would be required for one parity bit per byte. The ECC bits are used only in main memory and the L2 cache, to detect and correct errors in retrieved memory lines, while the directory entry is used by the home protocol engine (HPE) 122 to maintain cache coherence of the memory lines 184 corresponding to the directory entries 182.

Each directory entry 182 includes a state field 186 for indicating the state of the corresponding memory line 184, and a sharer-information field 188 for identifying nodes 102, 104 that have or might have a shared copy of the corresponding memory line 184. A directory entry 182 in a preferred embodiment contains 44 bits, with the state field 186 comprising a 2-bit field that is repeated (i.e., stored twice in each directory entry 182) and the sharer-information field 188 comprising a 40-bit field that is split into two 20-bit fields 188-1, 188-2. In a preferred embodiment there are two possible formats for the sharer-information field 188, with the format of the sharer-information field 188 in a given directory entry 182 being determined by the number of nodes 102, 104 sharing the memory line 184 corresponding to the directory entry 182. Generally, a node 102, 104 is said to "share" a memory line 184 if it maintains a read-only copy of the memory line 184—typically stored in a cache array 108, 110, 114 within the respective node 102, 104.

In a preferred embodiment (with a 40-bit sharer-information field and a maximum of 1023 nodes), when the number of nodes 102, 104 currently sharing a memory line 184 is four or less, a first sharer-information field 188 format called the "limited-pointer" format is used. In this format, the 40-bit sharer-information field 188 is divided into four 10-bit sub-fields, each of which is used to store a "direct node pointer" that identifies a node 102, 104 that is a sharer of the memory line 184. A predefined null pointer value (e.g., 1×000 or 0×3FF) is stored in one or more of the 10-bit sub-fields to indicate that the respective 10-bit field does not identify a node 102, 104 (e.g., when fewer than four nodes 102, 104 share a memory line 184). More generally, the size of the sharer-information field 188 and the number of bits required for each direct node pointer determines the maximum number (DP) of direct node pointers that a sharer-information field 188 can store. Additionally, the node pointers (i.e., identifiers) included in the 10-bit sub-fields are obtained from requests to share a corresponding memory line of information 184. Thus, each request to share a memory line of information 184 (described in detail below), includes a 10-bit identifier of the requesting node.

Also, in a preferred embodiment, when the number of nodes 102, 104 sharing a memory line 184 is more than four, a second sharer-information field 188 format called the "coarse vector" format is used. In this format, each bit in the sharer-information field 188 corresponds to one or more nodes 102, 104. More specifically, when the number of nodes 102, 104 in the multiprocessor system 100 is more than four but less than forty-one, each bit of the sharer-information field 188 either corresponds to one node 102, 104 or does not correspond to any node 102, 104. Thus, a set bit (zero or one depending on the specific implementation) in the sharer-information field 188 of a given directory entry 182 indicates that the one node 102, 104 corresponding to the set bit shares the memory line 184 corresponding to the directory entry 182. And when the number of nodes 102, 104 in the multiprocessor system 100 is more than forty, one or more of the bits in the sharer-information field 188 correspond to a plurality of nodes 102, 104. Thus, a set bit (zero or one depending on the specific implementation) in the sharer-information field 188 of a given directory entry 182 indicates that the one or more nodes 102, 104 corresponding to the set bit share the memory line 184 corresponding to the directory entry 182.

Because only one bit is used to identify one or more nodes 102, 104 when the sharer-information field 188 is in the coarse-vector format, each node 102, 104 in the multiprocessor system 100 must be mapped to a bit in the sharer-information field 188. The node to bit assignment table 189 of FIG. 4 illustrates a mapping of a plurality of nodes to a number of bits in a preferred embodiment (preferred embodiments of the invention do not actually utilize a table, which is included here merely for illustration). Specifically, table 189 shows 76 nodes 102, 104 mapped to respective bits in a 40-bit sharer-information field 188. Each column in table 189 is associated with a bit in the sharer-information field 188. Thus, according to table 189 the first bit in the sharer-information field 188 is associated with the node 102, 104 identified (and addressed) as 40. Since only 76 nodes 102, 104 are included in the multiprocessor system 100 of this example, table 189 includes only two rows. But if the number of nodes 102, 104 included in the multiprocessor system 100 in this example exceeded 79, 119, 159, etc., additional rows would be included in the table 189. In other words, additional nodes 102, 104 would be associated with one or more of the bits in the sharer-information field 188.

As indicated above, the numbers included in each entry of table 189 are node identifiers. The brackets around "0" is meant to indicate that 0 is not a valid node identifier in the embodiment illustrated in table 189. In this embodiment, zero is used in the limited-pointer format to indicate that a particular sub-field of the sharer-information field 188 does not identify a node 102, 104. To maintain consistency between the two formats, zero is not a valid node identifier in either format.

Determining the node identifiers for nodes 102, 104 associated with a given bit in sharer-information field 188 (which permits the home node 102, 104 to send out invalidation requests when a given sharer-information field 188 is in the coarse-vector format), is divided into two basic steps. Assuming that a given bit is set and associated with column 3 of table 189 (FIG. 4), the first node 102, 104 associated with this bit is simply the column number, i.e., 3. To calculate subsequent node identifiers of nodes 102, 104 associated with this bit, the system adds to the column number positive integer multiples of the number of bits included in the sharer-information field 188 to the column number. For example, for column three of the sharer-information field, the associated system nodes are 3, 43, 83 and so on. The second step (i.e., adding multiples of the number of bits in the sharer-information field 188) is continued until the calculated node identifier exceeds the total number of nodes 102, 104 in multiprocessor system 100, in which case, the previously calculated node identifier is the identifier of the final node 102, 104 associated with a given bit.

As noted above, each directory entry 182 includes a state field 186. In a preferred embodiment, the state field 186 is set to one of the following defined states:
  invalid: indicates that the corresponding memory line 184 is not shared by another node 102, 104;
  exclusive: indicates that a node 102, 104 has an exclusive copy of the corresponding memory line of information 184, and thus may make changes to the memory line of information 184;
  shared: indicates that the sharer-information field 188 is configured in the limited-pointer format described above and that the number of nodes having a non-exclusive (i.e., shared) copy of the corresponding memory line of information 184 is less than or equal to DP;
  shared-cv: indicates that more than DP nodes 102, 104 have a non-exclusive (i.e., shared) copy of the corresponding memory line of information 184 and that the sharer-information field 188 is configured in the coarse vector format described above.

Protocol Engines

Figure 5:
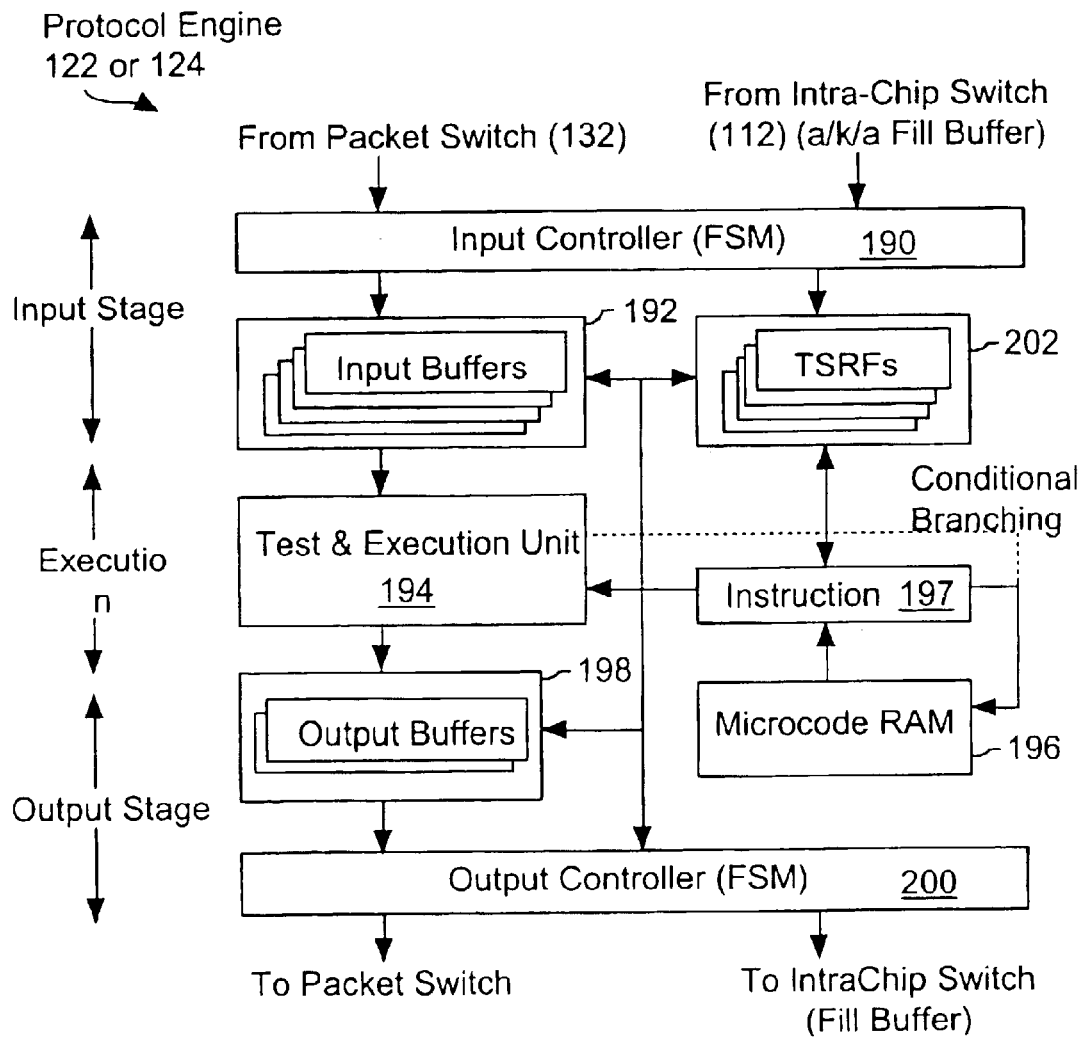
FIG. 5 is a block diagram of a protocol engine.

The basic architecture of each of the protocol engines 122, 124 (FIG. 1) is shown in FIG. 5. The protocol engines are responsible for handling memory transactions, such as the sharing of cache lines, the exclusive assignment of a cache line to a processor in a particular node of the system, remote read and write operations. The protocol engines 122, 124 are responsible for maintaining cache coherence of cache lines among the nodes 102, 104 of the multiprocessor system 100.

Each of the protocol engines 122, 124, as shown in FIG. 5, includes an input controller 190, preferably implemented as a finite state machine used in connection with a set of input buffers 192 for receiving data (inbound messages) from the ICS 112 and the PS 132. Received messages, some of which include a full cache line of data and the associated parity bits, are stored in the input buffers 192. In a preferred embodiment, sufficient input buffers 192 are provided to store inbound, received data for up to sixteen ongoing memory transactions. A test and execution unit 194 (herein called the execution unit) executes instructions obtained from an instruction memory 196, also called the microcode array, so as to advance memory transactions, also called cache coherence transactions. The currently selected instruction, obtained from the instruction memory 196, is held in a current instruction buffer 197 for decoding and execution by the execution unit 194. Output messages generated by the execution unit 194 are stored in a output buffers 198, the operation of which are controlled by an output controller 200, preferably implemented as a finite state machine. The output messages are transferred from the output buffers 198 to specified destinations within the same node 102, 104 as a protocol engine 122, 124 via the ICS 112 or to specified destinations within other nodes 102, 104 of the multiprocessor system 100 via the PS 132.

While the processor nodes 102 and I/O nodes 104 of a preferred embodiment use two protocol engines, including a home protocol engine (HPE) 122 (FIG. 1) for handling memory transactions where the node 102, 104 in which the protocol engine 122 resides is the home of the memory line that is the subject of the memory transaction, and a remote protocol engine (RPE) (124, FIG. 1) for handling memory transactions where a remote node 102, 104 is the home of the memory line that is the subject of the memory transaction, for most purposes the two protocol engines 122, 124 may be considered to be logically a single protocol engine.

Figure 6A:
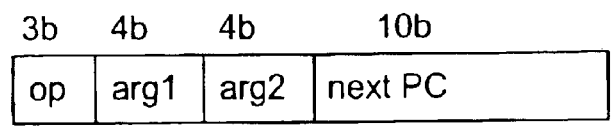
FIG. 6A depicts the instruction format of the instructions executed in one embodiment of the protocol engine of FIG. 5.

FIG. 6A shows the format of each of the instructions stored in the instruction memory 196 and instruction buffer 197. As shown, each instruction includes an operator, two operands, and a next program counter field. The operator indicates the type of operation to be performed by the execution unit 194 when executing the instruction, the two operands provide parameters that affect the execution of an instruction.

The current state of multiple memory transactions is stored in a set of registers collectively called the Transient State Register File (TSRF) 202. Each memory transaction has a memory line address (sometimes called the global memory address) that identifies the memory line that is the subject of the memory transaction. More specifically, the memory line address identifies the node 102, 104 that interfaces with the memory subsystem 123 that stores the memory line of information 184 (i.e., home node) and a specific position within the memory subsystem 123 of the memory line of information 184. In a preferred embodiment, the top M (e.g., 10) bits of the memory line address identify the home node 102, 104 of the memory line of information 184, while the remainder of the address bits identify the memory line 184 within the identified node. In a preferred embodiment, the memory line address for a memory line does not include any of the address bits used to identify sub-portions of the memory line, such as individual 64-bit words of individual bytes within the memory line of information 184. However, in other embodiments that support transactions on sub-portions of memory lines, the memory line addresses used may include bits for identifying such memory line sub-portions.

Figure 6B:
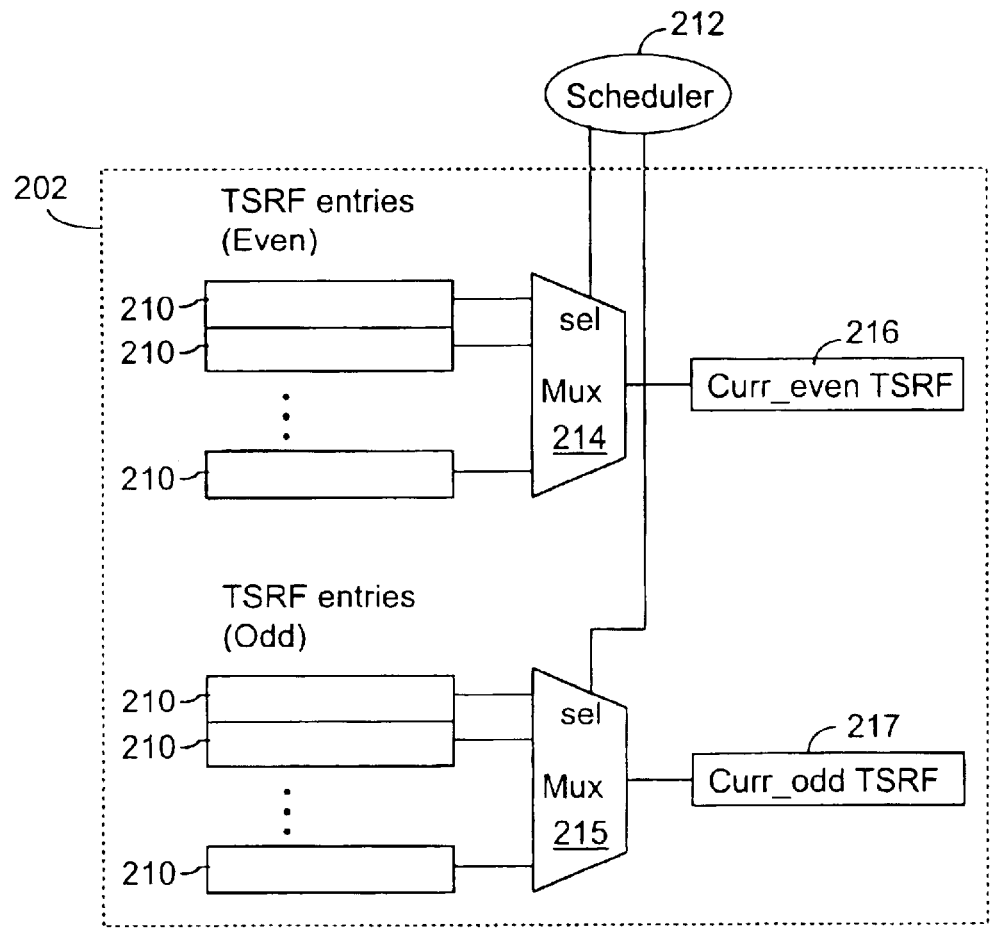
FIG. 6B is a block diagram of a portion of the TSRF selection logic of the protocol engine of FIG. 5.

Referring to FIG. 6B, each memory transaction has a respective entry 210 stored in the Transient State Register File (TSRF) 202 that indicates the state of the memory transaction. In a preferred embodiment, the TSRF 202 has registers for storing sixteen entries 210 as well as access circuitry for reading and updating the contents of the TSRF entries 210. Obviously the number of entries in the TSRF 202 is a design choice that will vary from one implementation to another. Typically, the TSRF 202 will include at least as many entries as the number of PCs 106 included in a processor node 102.

Referring to FIG. 6B, the entries 210 of the TSRF 202 are divided into two groups—"even" TSRF entries 210 and "odd" TSRF entries 210. The "even" TSRF entries 210 are used for memory transactions associated with memory lines of information 184 that have "even" memory line addresses (i.e., memory line addresses ending in a "0" bit), while the "odd" TSRF entries 210 are used for memory transactions associated with memory lines of information 184 that have "odd" memory line addresses (i.e., memory line addresses ending in a "1" bit).

Figure 7C:
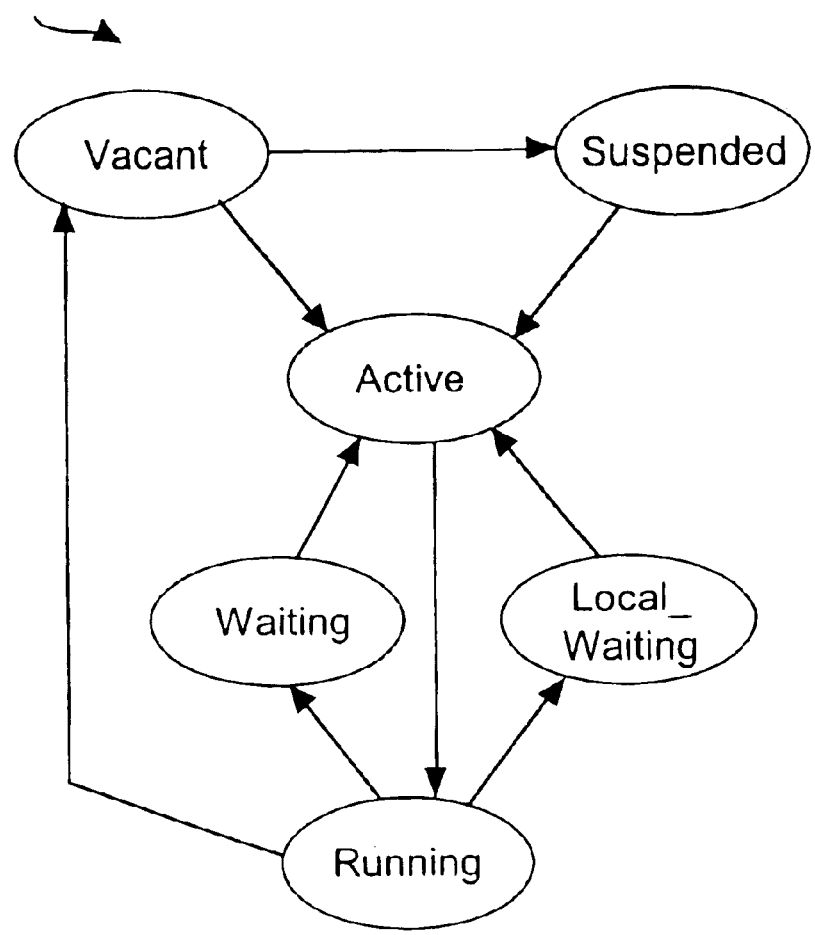
FIG. 7C depicts a state transition diagram for any single one of the TSRF entries in the Transient State Register File (TSRF) of the protocol engine of FIG. 5.

Referring to FIGS. 6B, 7A–7C, and 8, the sequence of operations required to execute an instruction so as to advance a memory transaction is: reading the TSRF entries, scheduling one of the transactions represented by the TSRF entries, retrieving from the instruction memory the instruction identified by the TSRF of the scheduled transaction, and executing the instruction. As shown in FIGS. 7A and 7B, this sequence of four operations is pipelined and is furthermore performed by two "logical pipelines" that are parallel but offset from each other by one clock cycle. One logical pipeline is for the odd TSRF entries and the other is for the even TSRF entries. However, the two logical pipelines are implemented using a shared scheduler 212, a shared microcode array 196 and access circuitry (see FIG. 8), and shared execute logic 240, which along with the scheduler 212 is part of the test and execution unit 194. Only the TSRF registers and access circuitry 202 have distinct even and odd circuits.

Alternating clock cycles of the test and execution unit 194 are called Even and Odd clock cycles. As shown in FIG. 7A, during each even clock cycle the following operations are performed, simultaneously, by the circuitry modules identified in FIG. 7B:

reading the Odd TSRF entries, including comparing the address in each of the Odd TSRF entries with the addresses of messages received from the packet switch and intra-chip switch;

scheduling a next Even transaction (by selecting an Even TSRF entry) to be advanced by executing an instruction identified by the "next PC" field of one of the Even TSRF entries;

reading the microcode instruction identified by (A) the Odd transaction scheduled in the immediately previous Odd clock cycle and the condition code (CC) bits stored in the TSRF entry for the scheduled Odd transaction; and executing the instruction for the currently scheduled Even transaction, where the instruction is identified by the "next PC" field of the Even transaction selected by the scheduler two clock cycles ago as well as the condition code bits stored in the TSRF of the currently scheduled transaction.

Similarly, as shown in FIG. 7A, during each Odd clock cycle the following operations are performed, simultaneously, by the circuitry modules identified in FIG. 7B:

reading the Even TSRF entries, including comparing the address in each of the Even TSRF entries with the addresses of messages received from the packet switch and intra-chip switch;

scheduling a next Odd transaction (by selecting an Odd TSRF entry) to be advanced by executing an instruction identified by the "next PC" field of one of the Odd TSRF entries;

reading the microcode instruction identified by (A) the Even transaction scheduled in the immediately previous Even clock cycle and the condition code (CC) bits stored in the TSRF entry for the scheduled Even transaction; and executing the instruction for the currently scheduled Odd transaction, where the instruction is identified by the "next PC" field of the Odd transaction selected by the scheduler two clock cycles ago as well as the condition code bits stored in the TSRF of the currently scheduled transaction.

The scheduler 212 selects the next Even (or Odd) transaction at the same time that the current Even (or Odd) transaction is being executed. In some circumstances, it is important for the current transaction to remain active and to be executed during two or more successive even clock cycles. For example, this is the case when a transaction needs to send two or more messages to other nodes in the system. The scheduler is able to determine whether the current Even (or Odd) transaction should be scheduled to execute again during the next Even (or Odd) clock cycle by inspecting the state, counters and condition codes in the TSRF of the currently executing transaction to determine if they satisfy predefined criteria for continuing execution of the current transaction for an additional execution cycle.

By interleaving instruction fetch and instruction execute cycles, the bandwidth and computational resources of the test and execution unit 194 and the microcode memory 196 are fully utilized.

As shown in FIG. 6B, the test and execution unit 194 (FIG. 5) of the protocol engine includes a scheduler 212 that selects an even TSRF entry 210 and an odd TSRF entry 210, corresponding to the next even memory transaction and the next odd memory transaction to be processed or advanced by the execution unit 194. The selections by the scheduler 212 are conveyed to a pair of multiplexers 214, 215 that transfer information from selected even and odd TSRF entries 210 to a pair of latches 216, 217 for storing the state of the currently running memory transactions. The TSRF entries stored in latches 216, 217 are used by the execution logic 242 (FIG. 8) of the execute unit 194 (FIG. 5).

Figure 6C:
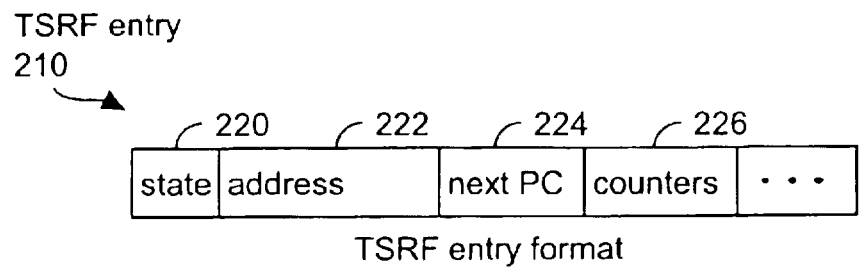
FIG. 6C depicts a subset of the fields of each TSRF entry in the Transient State Register File (TSRF) of the protocol engine of FIG. 5.

Referring to FIG. 6C, each TSRF entry 210 includes many fields, a small subset of which are identified and described below:

a state field 220: indicates the state of the associated memory transaction if any;

an address field 222: stores the memory line address associated with a memory transaction if any;

a next program counter field 224: identifies the next instruction to be executed by the execution unit when certain preconditions required for continued execution of the memory transaction are satisfied; and a set of counter fields 226: are used to store count values that, for example, control repeated execution of an instruction (e.g., when a transaction needs to send out N identical protocol messages to other nodes 102, 104, one of the counter fields 226 is initially to a value corresponding to N, and is then decremented or incremented after each execution of the instruction until a predefined terminal count value is reached, at which point the memory transaction is either complete or a next program counter for the transaction is determined). The counter fields 226 and the state field 220 together form an overall or more specific state of an associated memory transaction.

In a preferred embodiment, the set of defined states for the state field 220 include:

vacant (also called invalid): indicates that the TSRF entry 210 does not store information related to a memory transaction;

active: indicates that the associated memory transaction is available for scheduling/execution;

running: indicates that the associated memory transaction is currently running (i.e., is currently being executed by the execution unit 194, or was the transaction for which an instruction was executed during the last available even or odd execution cycle);

waiting: indicates that the associated memory transaction is stalled/deferred, waiting for a protocol message from another node 102, 104 to be delivered via the PS 132;

local_waiting: indicates that the associated memory transaction is stalled, waiting for a protocol message from within the same node 102, 104 to be delivered via the ICS 112; and suspended: indicates that the associated memory transaction is suspended because there is a memory address conflict with a previously allocated memory transaction having the same memory line address.

FIG. 7C shows all defined state transitions for each of the TSRF entries 210. A Vacant TSRF entry 210 becomes Active when a message initiating a new memory transaction is received and there is no unfinished transaction having the same memory line address and that blocks activation of the new memory transaction. A Vacant TSRF entry 210 becomes Suspended when a message initiating a new memory transaction is received and there is unfinished memory transaction having the same memory line address that blocks activation of the new memory transaction.

When an Active transaction is scheduled for execution it enters the Running state. If the execution of the transaction completes the transaction, the TSRF returns to the Vacant state. The Running Transaction remains in the Running state until it was sent all the protocol messages required for handling a current portion of the transaction. If execution of the transaction does not complete the transaction, the state of the TSRF becomes Waiting if the transaction is waiting for one or more messages from one or more other nodes to be able to continue the transaction, and becomes Local_Waiting if the transaction is waiting only for one or more messages from the local node to be able to continue the transaction.

The scheduler 212 includes arbitration logic for selecting the next even TSRF entry and the next odd TSRF entry to be sent to the execution unit 194 in accordance with (A) the states of the TSRF entries, (B) the buffered received messages received via the PS 132 and the ICS 112 and which TSRF entry, if any, corresponds to each of the buffered received messages, and (C) a set of prioritization rules. Each TSRF entry and each buffered received message identifies the memory line associated therewith, and the arbitration logic of the scheduler includes an array of comparators for comparing the memory line addresses in the TSRF entries with the memory line addresses in the buffered received messages so as to produce a corresponding set of status update signals. The status update signals are used for "upgrading" TSRF entries from the Waiting and Local_Waiting state to the active state, as well as for downgrading the TSRF entry for the last running transaction to the waiting, Local Waiting or vacant state, depending on whether the transaction is finished, and if not finished, what type of message (i.e., from the local node or a remote note) the transaction needs to receive in order to ready to resume execution.

The status update signals are also used to determine when a buffered received message has the same address as a previously allocated TSRF, but is for a different memory transaction. When this condition is detected by the arbitration logic, one of three actions is performed: (A) a new TSRF entry is allocated for the transaction associated with the received message, and the new transaction is suspended, (B) the received message is merged into previously allocated transaction and modifies its state, or (C) the message is temporarily left in the input buffer because the previously allocated transaction is not currently in a state allowing the received message to be merged with it, and the received message is then either merged with the previously allocated transaction or, if that transaction completes, a new TSRF is allocated for the new message and that TSRF is placed in the Active state. When the received message is of the type that could potentially be merged with a previously allocated transaction, the previously allocated transaction must be in the Waiting or Local_Waiting state before the merger can be performed. When a Receive instruction is executed, the transaction enters a Waiting or Local_Waiting state. The transaction can not enter the Active state until either (A) one of the predefined messages required to advance the transaction, or (B) one of the predefined messages that can be merged with the transaction is received.

Figure 8:
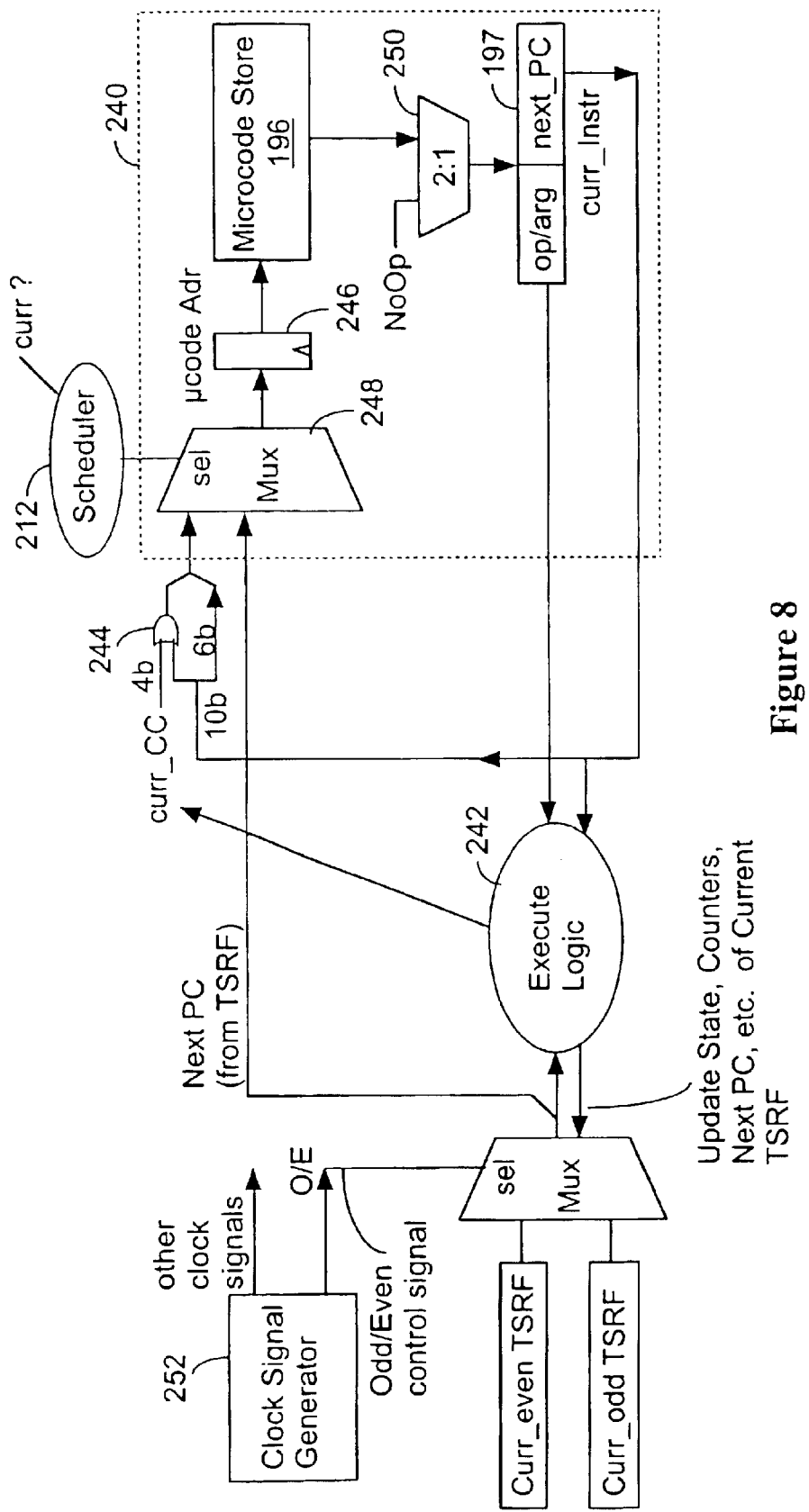
FIG. 8 is a block diagram of a portion the execution logic of the protocol engine of FIG. 5.

Referring to FIGS. 6B and 8, the scheduler 212 selects between continued execution of the currently Running transaction and any of the other Active transactions, if any. FIG. 6B shows a portion of the logic for selecting an Active transaction. FIG. 8 shows logic for continuing execution of a currently Running transaction. On the right side of FIG. 8 is shown a current instruction buffer 197 for holding the current instruction for Running transaction.

The operator and arguments of the current instruction are passed to the execute logic 242, which also has access to all the fields of the TSRF of the Running transaction. The execute logic computes a set of condition codes, labeled "Curr_CC" in FIG. 8, as well as new State and Next PC for the TSRF of the running transaction. The Next PC, to be stored in the TSRF of the current Running transaction, is obtained from the current instruction stored in buffer 197. The execute logic 242 may also update one or more counters in the TSRF of the current Running transaction as well as other fields of the TSRF.

When the scheduler 212 determines that the current Running transaction should continue to run, the next instruction for the transaction is determined as follows. The current instruction in buffer 197 includes a "Next PC" field that specifies the base address of a next instruction. Predefined bits (e.g., the four least significant bits) of the "Next PC" address are logically combined (by logic gate or gates 244) with the condition codes (Curr_CC) generated by the execute logic 242 so as to generate a microcode address that is stored in microcode address latch 246. Multiplexers 248 and 250 are provided to facilitate selection between the current Running transaction and another Active transaction. Multiplexers 248 and 250 operate during both Even and Odd clock cycles so as to perform separate instruction retrieval operations during Even and Odd clock cycles (See FIG. 7A).

When all the Even (or Odd) TSRF entries are in the Vacant state, meaning that there are no running, active or waiting Even (or Odd) memory transactions, there are no Even (or Odd) memory transactions for the scheduler to select for execution, and thus the corresponding logical pipeline is unused. More generally, when none of the Even (or Odd) TSRF entries are in the Running or Active state (see discussion of FIG. 6C), meaning that there are no Even (or Odd) memory transactions that are ready to be processed by the execution unit of the protocol engine, the corresponding logical pipeline is unused. During the corresponding clock periods instructions are not fetched from the instruction memory and the test and execution unit remains dormant.

The operation of the protocol engine while handling various specific memory transactions will be described in more detail below. Additional aspects of the scheduler and execution logic will also be described in more detail below.

L1 Cache

Figure 9A:
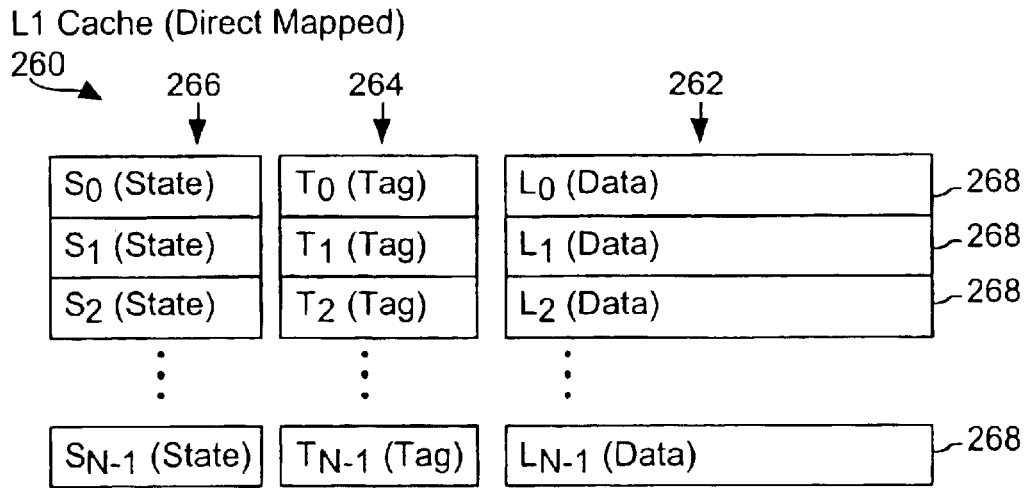
FIGS. 9A and 9B depict two embodiments of the Tag-State and Data arrays of an L1 cache.

Referring to FIG. 9A, for simplicity a direct mapped version of the L1 cache 260 will be explained before explaining the two-way set associative version, shown in FIG. 9B. Each L1 cache 260, whether it is a data or instruction cache (see FIG. 1) includes a data array 262 for storing cache lines, a tag array 264 and a state array 266. Each entry 268 of the L1 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Each address used to access memory consists of a string of address bits, ABCD, where A, B, C and D each consist of different groups of the address bits. The D bits are used to identify specific words (or bits, or bytes, depending on the implementation) within the cache line. The B and C bits, herein called BC, identify the entry 268 into which the memory line at address ABC0 is stored within the L1 cache. The BC bits are called the index or cache index of the address. The A bits comprise the tag of the cache line, which together with the cache index uniquely identify the memory line. The only reason for dividing the cache index bits, BC, into two groups is for purposes of explaining the embodiment shown in FIG. 9B.

The state of each L1 cache entry 268 is represented by two bits, which for each cache line represent one of four predefined states:

invalid, which means that the cache entry 268 is empty, or that the data in it is invalid and should not be used;
shared, which means that other processors or other nodes in the system have non-exclusive copies of the same memory line as the one stored in the cache entry;
clean_exclusive, which means that this L1 cache has the only copy of the associated memory line, has been allocated exclusive use thereof, and that the value of the cache line has not been changed by the processor coupled to the L1 cache; and
dirty_exclusive, which means that this L1 cache has the only copy of the associated memory line, has been allocated exclusive use thereof, and that the value of the cache line has changed by the processor coupled to the L1 cache.

Figure 9B:
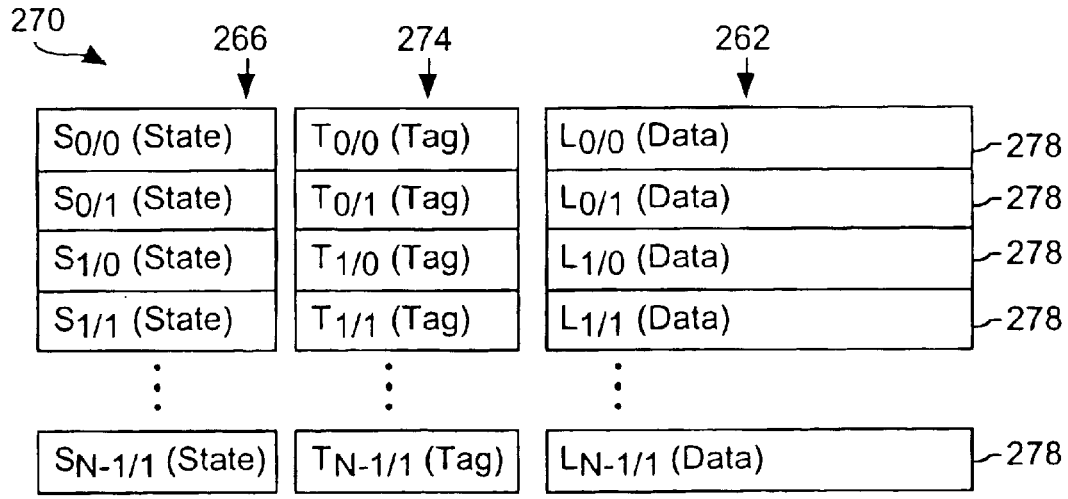

Referring to FIG. 9B, there is shown a two-way associative version of the L1 cache, which is a preferred implementation. Only the differences between the L1 caches of FIGS. 9B and 9A will be described. In particular, the set associative L1 cache 270 has the same number of entries 278 as the direct mapped L1 cache 260, but in this version there are two cache lines mapped to each cache index instead of just one. As a result, there are only half as many cache index values, and therefore the cache index is represented by just the C bits of the ABCD address bits. In this embodiment of the L1 cache, the B address bit of each memory line address is included in the tag of the entry, and thus the tag array 274 is one bit wider in this embodiment than in the direct mapped L1 cache embodiment. If the L1 cache were a four-way associative cache, the tag array 274 would be two bits wider than in the direct mapped L1 cache embodiment. A two-way associative L1 cache is preferred over a direct mapped cache because it reduces cache evictions caused by cache index conflicts.

L1 Data Paths and Control Logic

Figure 9C:
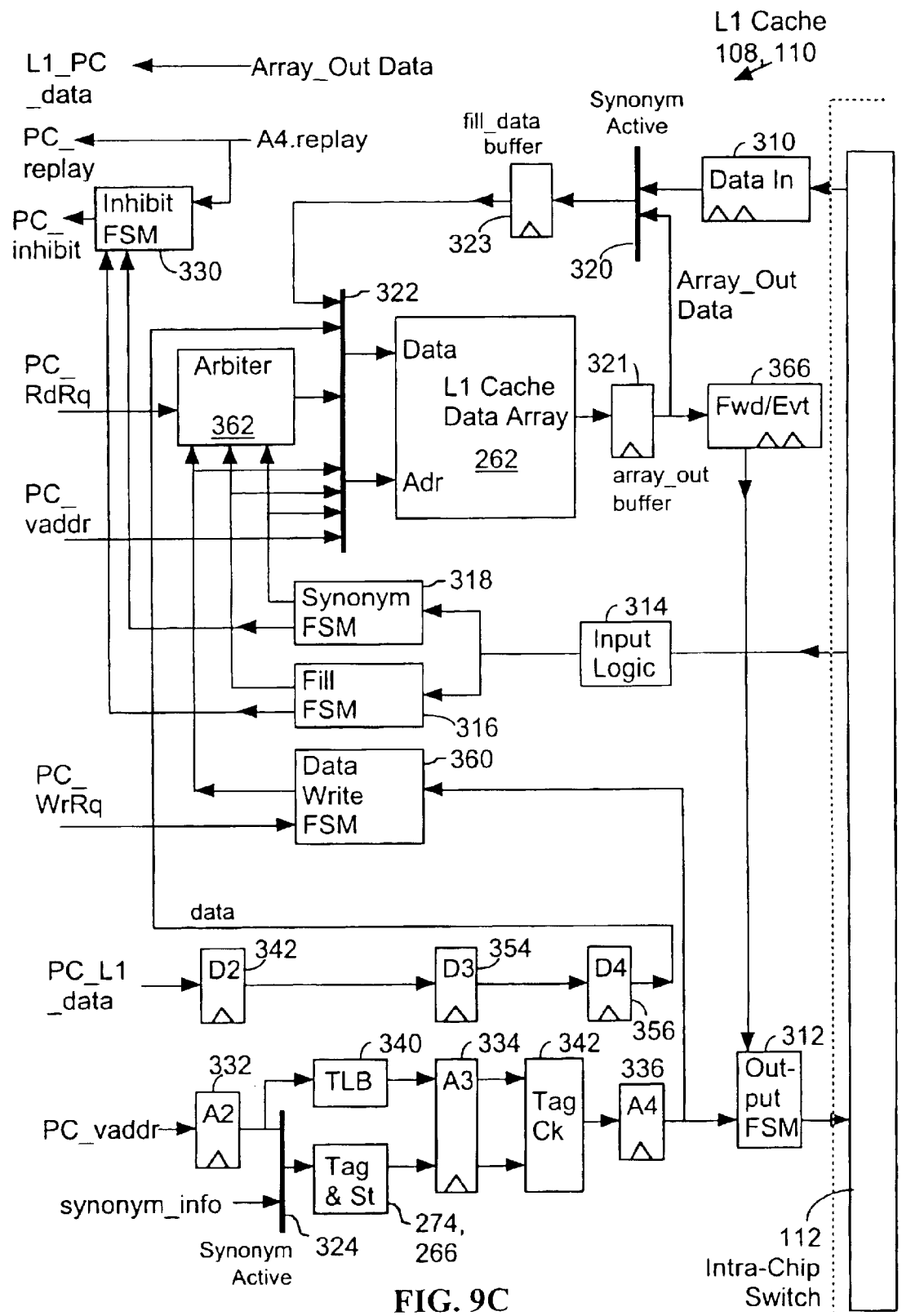
FIG. 9C shows the architecture of the L1 cache in more detail.

FIG. 9C shows the data paths and primary components of the L1 cache 108, 110. Some of the connections between the various finite state machines of the L1 cache and some of the connections between those finite state machines, the tag and state arrays 274, 266 and other components of the L1 cache 108, 110 that are described below are not shown in FIG. 9C in order to avoid undue cluttering of this figure.

The L1 cache receives data (PC_L1_data) and a virtual address (PC_vaddr) from the processor core coupled to the L1 cache. Other signals received by the L1 cache from the processor core are a read request signal (PC_RdRq), which signals that the processor core is requesting data from the L1 cache, and a write request (PC_WrRq), which signals that the processor is requesting to write data into the L1 cache. The signals sent by the L1 cache to the processor core include data output by the L1 cache (L1_PC_data), a replay signal (PC_replay) requiring the processor to retry the last request sent by the processor core to the L1 cache, and an inhibit signal (PC_inhibit) to inform the processor core to inhibit its memory accesses because the L1 cache is busy (e.g., servicing a cache miss).

The L1 cache receives data from and sends data to the L2 cache, main memory, and other devices via the intra-chip switch 112. Received data is temporarily buffered by a data in buffer 310, and data being sent elsewhere is output via an output finite state machine (Output FSM) 312. The output buffer for sourcing data to the ICS 112 is called the Fwd/Evt buffer 366.

Input logic 314 receives control signals sent via the ICS 112 and conveys those control signals to either a fill FSM 316 or a synonym FSM 318. The fill FSM 316 controls the loading of a cache line received from the ICS 112 into the L1 cache data array 262. The synonym FSM 318 controls the movement of a cache line from one L1 cache slot to another when the L2 cache instructs the L1 cache to do so. Multiplexer 320 routes cached data from a slot of the L1 cache data array 262 back to the data array input multiplexer 322 under the control of the synonym FSM 318. Input and output staging buffers 321, 323 are preferably used in this data path, for instance to facilitate delivery of successive portions of the data in a cache line over the data path.

When the synonym FSM 318 is not active, multiplexer 320 sources data from the data input buffer 310 to the data array input multiplexer 322. The movement of a cache line from one L1 cache slot to another is required when the cache line index derived from a virtual address does not match the physical location of a cache line in the L1 cache. A tag information input multiplexer 324 is also controlled by the synonym FSM 318 to enable tag information for the L1 tag array 274 to be sourced by synonym information from the synonym FSM 318 when the synonym FSM 318 is activated. When the synonym FSM 318 is not activated, the tag information input multiplexer 324 sources tag information for the L1 tag array 274 from the virtual address (PC_vaddr) provided by the processor core.

An inhibit FSM 330 receives signals from the fill FSM 316 and synonym FSM 318 when those finite state machines are activated and sources the PC_inhibit signal to the processor core while either of these finite state machines is servicing a cache fill or synonym cache line relocation operation.

When the processor core sends either a read or write request to the L1 cache, the processor core provides a virtual address, PC_vaddr. The virtual address and information derived from it, such as a valid tag match signal, are stored in a series of staging buffers 332, 334, 336. Additional staging buffers, beyond those shown in FIG. 9C, may be required in some implementations. The virtual address is translated into a physical address (PA) by a translation lookaside buffer (TLB) 340 at the same time that a tag and state lookup is performed by the tag and state arrays 274, 266. The resulting physical address and tag lookup results are stored in a second staging buffer 334 and are then conveyed to a tag checking circuit 342 that determines if there is a tag match for a valid cache line. The results of the tag check, which includes state information as well as tag match information and the virtual address being checked, are stored in yet another staging buffer 336. The information in the staging buffer 336 is conveyed to a data write FSM 360 when a valid match is found, and is conveyed to the output FSM 312 when a cache miss is detected. The final staging buffer 336 also stores a "replay" signal, generated by the tag checking circuit 342, and the replay signal is conveyed to the processor core to indicate whether the L1 read or write operation requested by the processor core must be resubmitted to the L1 cache after the PC_inhibit signal is deactivated.

When a data write is being performed, the write request signal (PC_WrRq) and the results of the tag lookup are used by a data write FSM 360 and a cache access Arbiter 362 to determine if (and when) the data sourced by the processor core is to be written into the L1 cache data array 262. The data sourced by the processor core is buffered in a series of staging buffers 352, 354, 356 so that the data to be written is available at the data array input multiplexer 322 at the same time that the tag check results become available to the data write FSM 360. The data write FSM 360 stalls the data pipeline 352, 354, 356 if the arbiter 362 determines that the L1 cache is not ready to store the sourced data into the L1 cache data array 262.

When a data read is being performed, the read request signal (PC_RdRq) is received directly by the arbiter 362 and the virtual address is used to directly read a cache line in the data array 262 even before the results of the tag lookup and check are ready. The data read from the data array is temporarily buffered in staging buffer 321 and is discarded if a cache miss is detected. If the read data is being read in response to a processor core request and a cache hit is detected, the read data is sourced from the staging buffer 321 to the processor core via the data path labeled Array_Out Data (L1_PC_data). If the read data is being read in response to a request received via the ICS 112, the read data is sourced from the staging buffer 321 to the Fwd/Evt buffer 366, and from there it is conveyed to the output FSM 312 for transmission to the requesting device via the ICS 112.

L2 Cache with Duplicate L1 Tags

Figure 10A:
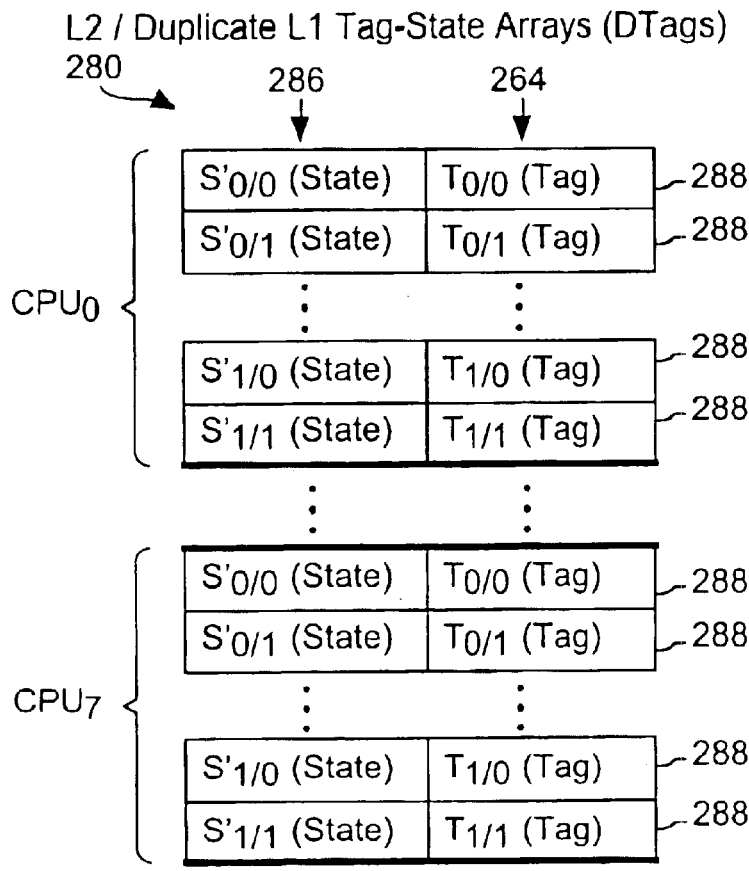
FIGS. 10A and 10B depict the duplicate tag, tag-state and data arrays of an L2 cache.

Referring to FIG. 10A, the L2 cache includes a set of "duplicate L1 tag and state arrays" 280. These "DTag" arrays 280 contain exact copies of the tag arrays of all the L1 caches in the same node as the L2 cache, and furthermore contain state information that is similar to, but not identical, to the state information in the L1 cache state arrays 266 (FIG. 9A). Thus, each entry 288 of the DTag arrays 280 corresponds to exactly one of the L1 cache entries 268 in the L1 caches of the node. The relationship between the state information in the L1 cache, the state information in the DTag arrays 280 of the L2 cache, and the state information in the L2 cache (see FIG. 10B) is as follows:

| L1 state | DTag-L1 state | Possible corresponding L2 states |
|---|---|---|
| invalid | invalid | invalid, clean, clean_nodex, dirty |
| shared | shared_clean | invalid, clean, clean_nodex, dirty |
|  | shared_clean_owner | invalid |
|  | shared_clean_owner_nodex | invalid |
|  | shared_dirty | invalid |
| clean_exclusive | exclusive | invalid |
| dirty_exclusive |  | invalid |

As shown in the above table, the L2 cache keeps additional information in the DTag arrays regarding the ownership of shared cache lines. For instance, the shared_clean_owner_nodex state for any particular cache line indicates that the cache line in the L1 cache has not been modified, and that this node is the exclusive owner of the cache line. The clean_nodex state in the L2 cache means the same thing.

An L1 cache line with a DTag state of exclusive, shared_dirty, shared_clean_owner or shared_clean_owner_nodex is the owner of the cache line. If the L2 cache has a valid copy of the cache line, it is the owner of the cache line, and the only possible DTag states for that cache line are invalid or shared_clean. An L1 cache always performs a write-back when it replaces a cache line of which it is the owner. The written back cache line is loaded into the L2 cache, possibly victimizing another L2 cache line.

The L1 cache owner of a cache line responds to other L1 misses on the same cache line. In this case the requester of the cache line become the new owner and the previous owner's DTag state for the cache line is changed to shared_clean.

If a cache line is present in a particular node, node-exclusive information is kept in either the L2 state of in the DTag state of the owner L1 cache. The L2 states clean_nodex and dirty, and the DTag states shared_clean_owner_nodex, shared_dirty and exclusive all indicate that the node is the only node in the system that is caching the identified memory line (i.e., identified by the tag and cache index of the cache line). In a preferred embodiment, dirty (i.e., modified) cache lines are never shared across nodes. Thus, if a node has cache line that has been modified with respect to the memory copy, no other node in the system can have a copy of the line. As a result, when a node requests a shared copy of a cache line that has been modified by another node, the memory transaction that satisfies the request will always write-back the modified data to memory. Within a single node, however, a preferred embodiment allows sharing of a modified cache line among the processor cores. In this case, the DTag state of the L1 owner is set to shared_dirty and any other sharers have their DTag state set to shared_clean.

Figure 10B:
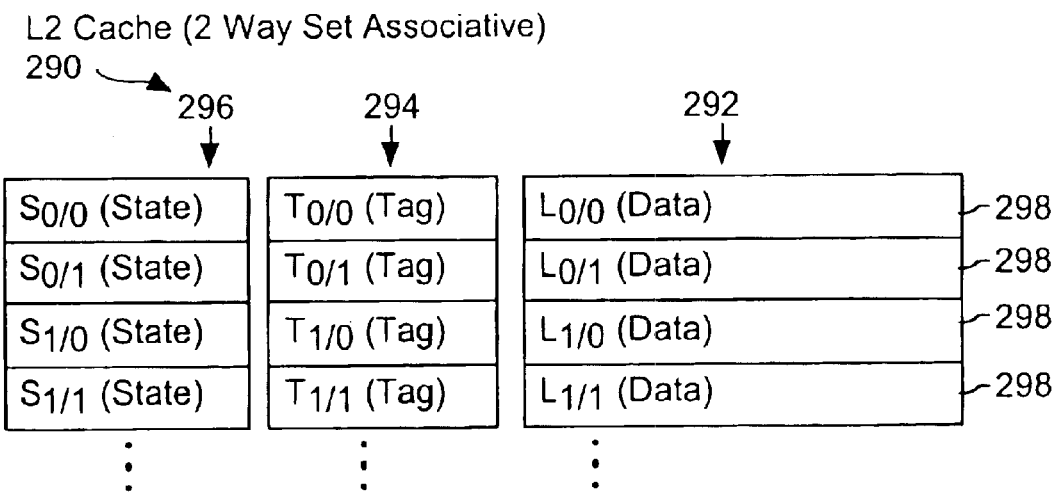

Referring to FIG. 10B, the main L2 cache array 290 includes a data array 292 for storing cache lines, a tag array 294 and a state array 296. The L2 cache array is preferably distributed across eight interleaved arrays, but for purposes of this explanation, the interleaved array structure is not shown, as it does not affect the logical organization and operation of the L2 cache. Each entry 298 of the L2 cache 260 includes a cache line, a tag and a state value. The cache line consists of the data from one memory line, and in a preferred embodiment this consists of 64 bytes (512 bits) of data plus parity and ECC bits corresponding to the 64 bytes.

The tag of each entry 268 consists of the address bits required to uniquely identify the cache line, if any, stored in the entry. Because the L2 cache is typically much larger than the L1 caches, a different subset of the address bits of a memory line address is used to identify the cache index and a different subset of the address bits is used as the tag compared with the address bits used for those purposes in the L1 caches.

The L2 cache line state value for each L2 cache entry is selected from among the following state values:

- invalid, which means that the cache entry 268 is empty, or that the data in it is invalid and should not be used;
- clean, which means that the value of the memory line has not been changed and is therefore the same as the copy in main memory, and furthermore means that copies of the cache line may be stored in (A) one or more of the L1 caches of the same node as the L2 cache and/or (B) the L1 or L2 caches in other nodes of the system, and that these copies are non-exclusive copies of the same memory line as the one stored in the L2 cache entry;
- clean_nodex (clean node-exclusive), which means that the L2 cache has a clean copy of the associated memory line (i.e., the memory line has not been changed and is the same as the copy in main memory), and that there may be cached copies of this memory line in local L1 caches in the same node as the L2 cache, but there are no copies of the memory line in any other nodes of the system; and
- dirty, which means that this L2 cache has the only copy of the associated memory line, and that the value of the cache line has been changed by one of the processor cores coupled to the L2 cache.

L2 Data Paths and Control Logic

Figure 10C:
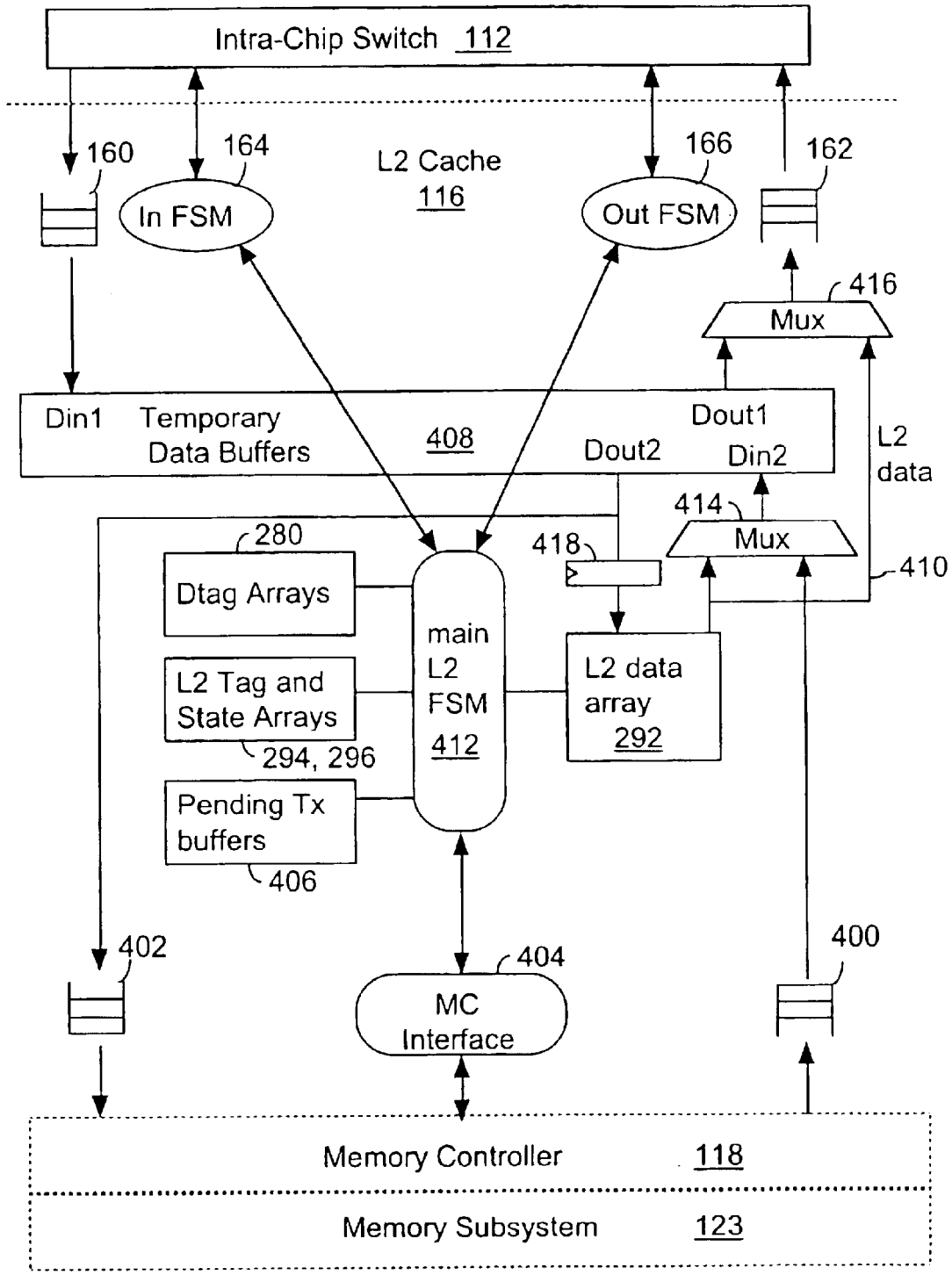
FIG. 10C shows the architecture of the L2 cache in more detail.

FIG. 10C shows the data paths and primary components of the L2 cache 116. As described earlier with respect to FIG. 3, the L2 cache has an interface to the intra-chip switch 112. This interface includes one or more input buffers 160, one or more output buffers 162, an input finite state machine (In FSM) 164 for controlling use of the input buffer(s) 160, and an output finite state machine (Out FSM) 166 for controlling use of the output buffer(s) 162. Similarly, the L2 cache 116 has an interface to the memory controller 118 (see also FIG. 1) that includes one or more input buffers 400, one or more output buffers 402 and a memory controller interface finite state machine (MC interface FSM) 404 for controlling the use of the MC interface input and output buffers 400, 402.

A set of pending buffers 406 are used to store status information about memory transactions pending in the L2 cache. For instance, the pending buffers 406 keep track of requests made to the memory subsystem (see FIG. 1) via the memory controller 118. A set of temporary data buffers 408 are used to temporarily store cache line data associated with pending memory transactions, including data being sourced to the L2 cache, data sourced from the L2 cache, and data transported through the L2 cache (i.e., from the memory subsystem 123 to the L1 cache). Data sent by the L2 cache in response to an L1 cache miss bypasses the temporary data buffers 408 and is sent via a bypass data path 410 so as to reduce latency when the L2 cache contains the data needed to satisfy a cache miss in an L1 cache (which is coupled to the L2 cache via the ICS 112).

The duplicate tag (DTag) arrays 280 and L2 tag and state arrays 294, 296 have been discussed above with reference to FIGS. 10A and 10B. Access to and updating of these arrays is handled by the main L2 finite state machine 412. The main L2 FSM 412 includes DTag and tag lookup, DTag and tag checking, and DTag, tag and state updating logic.

When an L1 cache miss is serviced by the L2 cache 116, and the L2 cache does not have a cached copy of the memory line required by the L1 cache, the request is forwarded to the memory subsystem 123 via the MC interface FSM 404. The memory line of information provided by the reply from the memory subsystem 123 is not stored in the L2 cache 116. Instead the memory line is sent directly to the L1 cache, bypassing the L2 data array 292. More specifically, the reply from the memory subsystem is directed through multiplexer 414 to the Din2 input port of the temporary data buffers 408. The reply is then output at the Dout1 port of the temporary data buffers 408 to the interface output buffer 162 via output multiplexer 416.

When an L1 cache evicts a memory line from the L1 cache, the victim memory line is sent to the L2 cache for storage via the ICS 112 and the interface input buffer 160. The victim memory line is received at the Din1 input port of the temporary data buffers 408 and temporarily stored therein. The victim memory line is then sent from the temporary data buffers 408 to the L2 data array 292, via the Dout2 port of the temporary data buffers 408 and a staging buffer 418, for storage in the L2 data array 292.

When the L2 cache sources a memory line to an L1 cache, the memory line read from the L2 data array 292 is conveyed via bypass line 410 to output multiplexer 416, and from there to the ICS interface output buffer 162. The output FSM 166 handles the transfer of the memory line from the output buffer 162 to the ICS 112, and from there it is sent to the L1 cache.

Duplicate tags (DTags) are used by the L2 cache to determine which L1 caches have cached copies of an identified memory line. The duplicate tags in the DTag arrays 280 are accessed by the main L2 FSM 412, and information derived from the duplicate tags is used to send messages via the output FSM 166 to one or more of the L1 caches in the same node as the L2 cache, or to other components of the node.

Cache Coherence Protocol

The present invention includes a cache coherence protocol (CCP) that enables the sharing of memory lines of information 184 across multiple nodes 102, 104 without imposing protocol message ordering requirements or requiring negative acknowledgments (NAKs). Because invalidation NAKs are not used in this invention, the CCP includes an assumption that the various requests (e.g., read request) discussed below always succeed. Additionally, the CCP is invalidation based, so shared copies of a memory line of information 184 are invalidated when the memory line of information 184 is updated.

As noted above, memory transaction relates to a memory line of information. Completion of a memory transaction requires a plurality of protocol messages, which are generated in part by instructions. Preferred embodiments of the present invention use seven instruction types: SEND, RECEIVE, LSEND (to local node), LSEND_REC (combined send/receive to/from local node), TEST, SET, and MOVE. The actual protocol code is specified at a slightly higher level with symbolic arguments, and C-style code blocks. A sophisticated microcode assembler is used to do the appropriate translation and mapping to instruction memory 196.

Typical memory transactions require only a few instructions at each node 102, 104 for completion. For example, a memory transaction including a read request of a memory line of information 184 stored in a memory subsystem interfaced with a remote node 102, 104 requires a total of four instructions at the requesting node 102, 104: a SEND of the read request to the remote node 102, 104; a RECEIVE of the read reply; a TEST of the state of the memory transaction (e.g., state field 220 and counters field 226); and an LSEND that sends a protocol message based on the read reply to the PC 106 that initiated the memory transaction. The CCP supports read, read-exclusive, exclusive, and write-back request types. A number of other protocol messages are supported as well in order to implement the requests.

Figure 11B:
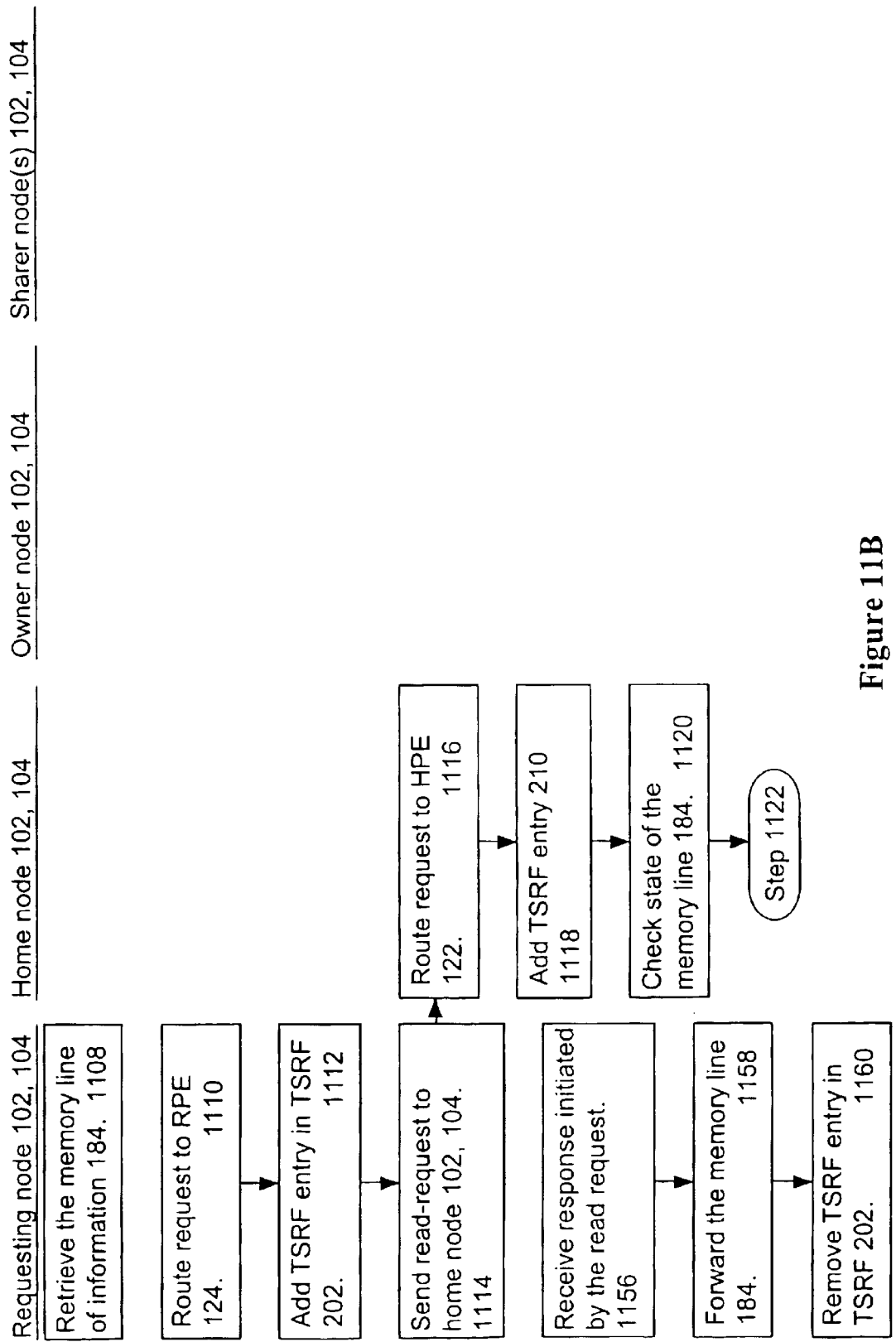

The request types are now discussed in greater detail. FIG. 11A illustrates steps executed to satisfy a read request for a memory line of information 184. In a first step, a PC 106 issues the read request for the memory line of information 184 (step 1100). If the memory line of information 184 is stored locally (step 1102-Yes), the state of the memory line of information 184 is checked by reference to a corresponding entry 182 in the directory 180 (step 1104). If the directory entry 182 does not indicate that a remote node 102, 104 has an exclusive copy of the memory line of information 184 (step 1106-No), the memory line of information 184 is retrieved directly from the memory subsystem 123 (FIG. 11B, step 1108).

If the memory line of information 184 is not stored locally (step 1102-No), the read request is routed to the RPE 124 (step 1110). The RPE 124 adds an entry 210 in the TSRF 202 (step 1112). The new entry 210 indicates that a read reply is required to advance the state of this memory transaction. The new entry 210 also indicates that until the read reply is received, incoming requests related to the memory line of information 184 are stalled, which means that a TSRF entry 210 is added to the TSRF 202 for the incoming requests. Once the read reply is received, the state of the TSRF entry 210 is updated by the RPE 124 so that these incoming requests are processed.

The RPE 124 then sends a read request to the home node (step 1114). The home node is the node 102, 104 to which the memory subsystem 123 storing the memory line of information 184 is interfaced.

Figure 11C:
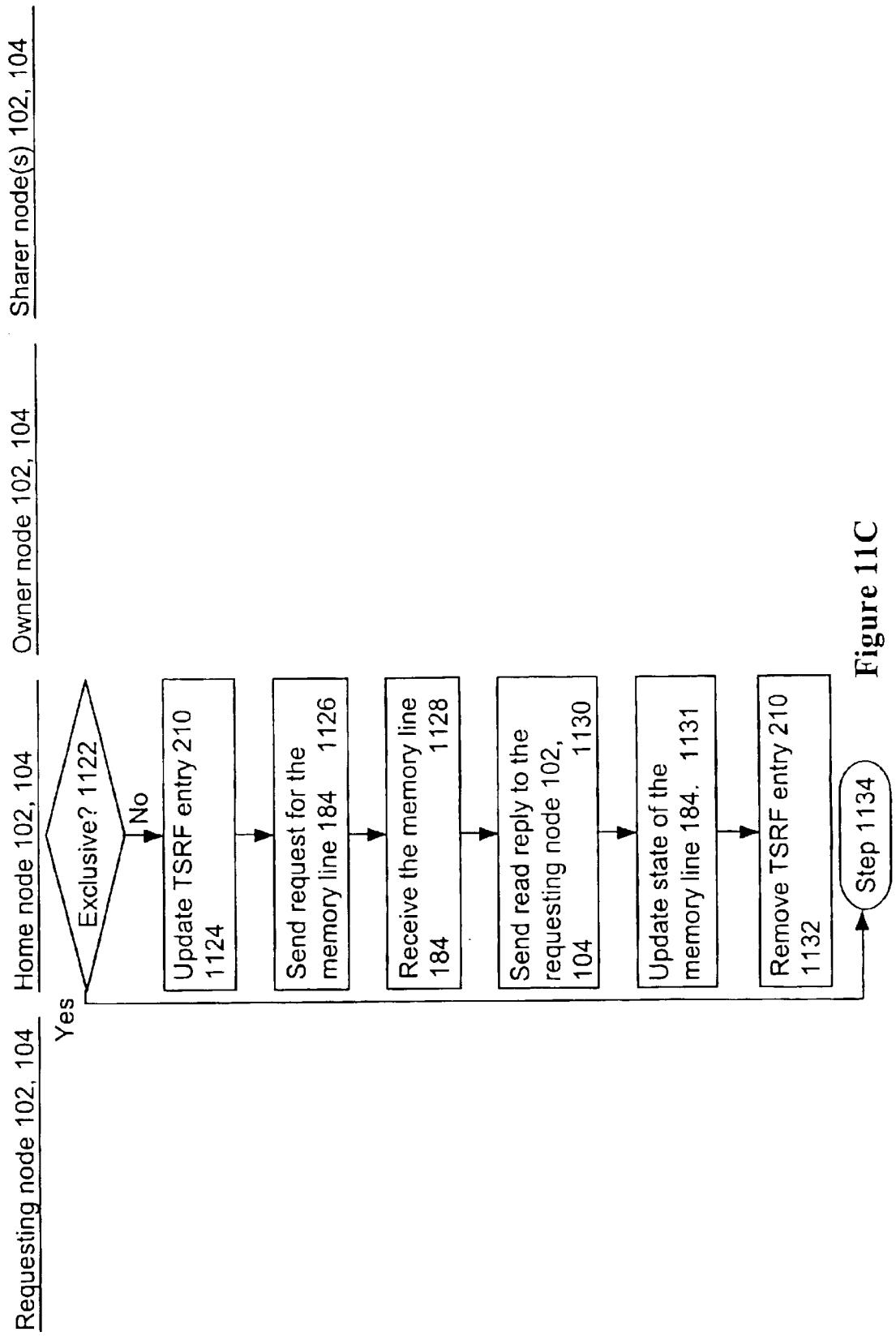

The read request is received by the home node 102, 104, and routed internally as described above to the HPE 122 (step 1116). The HPE 122 responds by adding an entry 210 in the TSRF 202 (step 1118) and checking the state of the memory line of information 184 in a corresponding entry 182 in the directory 180 (step 1120). If the entry 182 does not indicate that a node 102, 104 has an exclusive copy of the memory line of information 184 (FIG. 11C, step 1122-No), the HPE 122 updates the entry 210 in the TSRF 202 so that it indicates that the memory transaction requires an internal response to a request for the memory line of information 184 in order to advance to another state (step 1124). The HPE 122 then submits an internal request for the memory line of information 184 from the memory subsystem 123 (step 1126). Upon receiving the memory line of information 184 (step 1128), the HPE 122 sends a read reply to the requesting node 102, 104 (step 1130), updates the state of the memory line of information (step 1131), and removes the TSRF entry 210 (step 1132).

As noted above, the state of the memory line of information 184 is embodied in a corresponding entry 182 in the directory 180. Included in the entry 182 is a state field 186 and a sharer-information field 188. If the state field 186 indicates that the state of the memory line of information is shared-cv, the HPE determines which bit in the bits of the sharer-information field 188 the requesting node 102, 104 is mapped to. If the bit is not already set to indicate that a node 102, 104 mapped to that bit is sharing a copy of the memory line of information 184, the bit is so set.

If the state field 186 indicates that the state of the memory line of information is "shared", the HPE 122 determines if the requesting node 102, 104 is already identified as sharing the memory line of information 184 in the sharer-information field 188. If so, the sharer-information field 188 and state field 186 are not changed. If the requesting node 102, 104 is not already identified as sharing the memory line of information 184, the HPE 122 determines if any of the sub-fields within the sharer-information field 188 is set to indicate that it does not identify a sharer node 102, 104 (e.g., set to zero). If such a field is found, the HPE 122 sets it to identify the requesting node 102, 104. As noted above, the identity of the requesting node 102, 104 is included in the original request to share the memory line of information 184. If no such sub-field within the sharer-information field 188 is set to indicate that it does not identify a sharer node 102, 104, the HPE 122 must set the state field 186 to "shared-cv". Additionally, the HPE 122 must identify and set the bits in the 40-bit sharer-information field associated with (A) the four nodes 102, 104 previously identified by the sharer-information field 188 and (B) the requesting node 102, 104. The HPE 122 then removes the entry 210 from the TSRF 202 (step 1132).

Figure 11D:
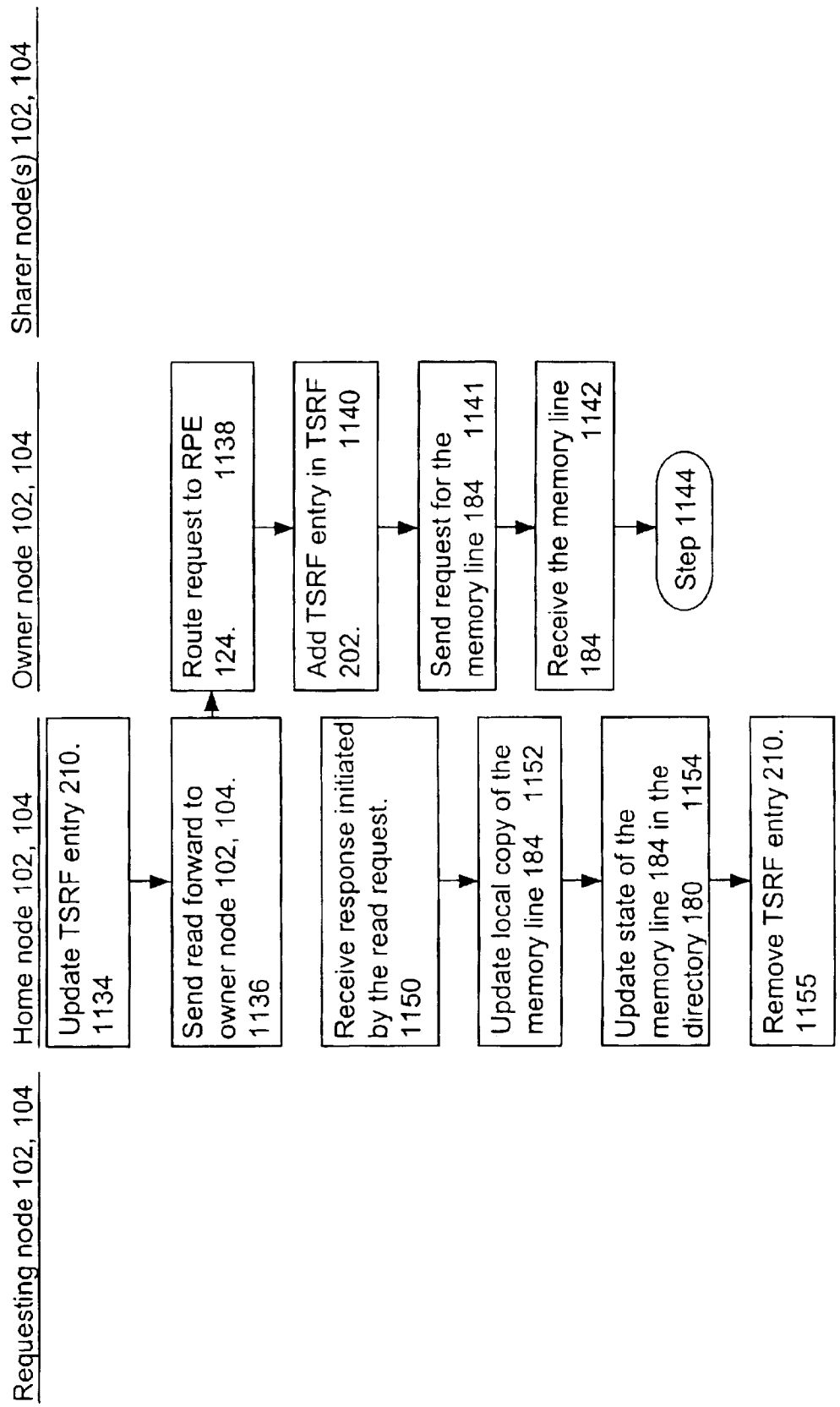

If the entry 182 indicates that a node 102, 104 (i.e., owner node) has an exclusive copy of the memory line of information 184 (step 1122-Yes), the HPE 122 updates the entry 210 in the TSRF 202 so that it indicates that the memory transaction requires a share write-back in order to advance to another state (FIG. 11D, step 1134). The state also indicates that any requests related to the memory line of information 184 received while the HPE 122 is waiting for the share write-back should be deferred (i.e., stalled) until after receipt of the share write-back. This is accomplished by adding a new entry 210 to the TSRF 202 for such requests, and setting the state of these new entries 210 to indicate that the associated memory transaction is eligible for processing once the share write-back is received.

Figure 11E:
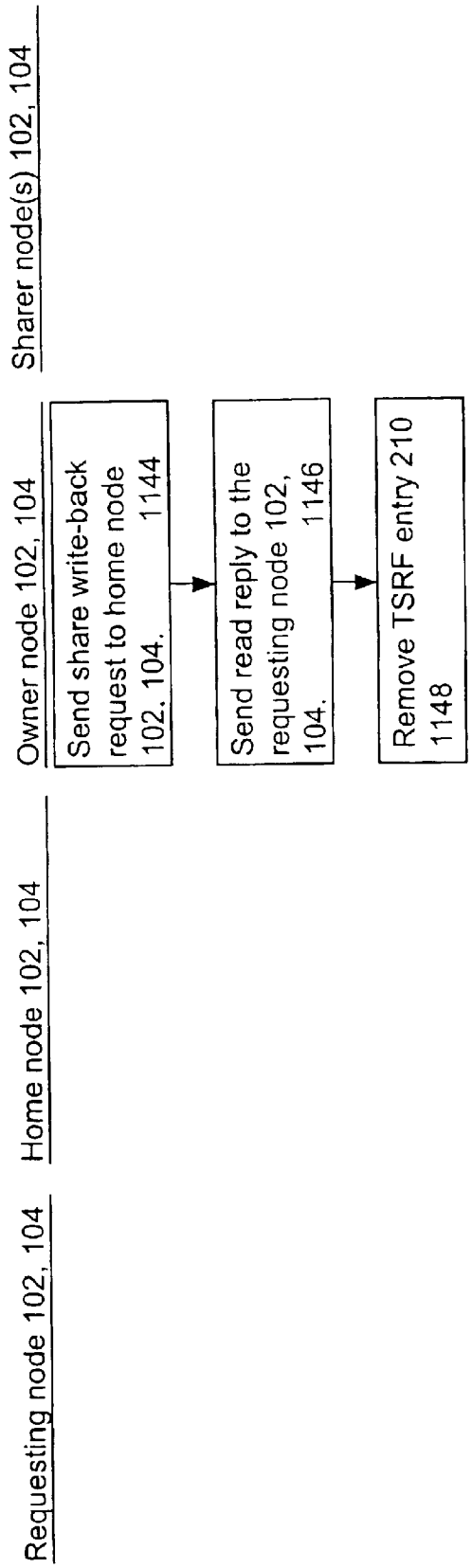

The HPE 122 then sends a read forward to the owner node 102, 104 (step 1136). The read forward is received by the owner node 102, 104, and routed to the RPE 124 (step 1138). The RPE 124 responds by adding an entry 210 in the TSRF 202 indicating that the memory transaction requires an internal response to a request for the memory line of information 184 in order to advance to another state (step 1140). The RPE 124 then sends an internal request for the memory line of information 184 from L1 or L2 cache 110, 114 (step 1141). Upon receiving the memory line of information 184 (step 1142), the RPE 124 sends a share write-back to the home node 102, 104 (FIG. 11E, step 1144) and a read reply to the requesting node 102, 104 (step 1146), both of these protocol messages include an up-to-date copy of the memory line of information 184. The RPE 124 also removes the entry 210 from the TSRF 202 (step 1148).

Upon receiving the share write-back (step 1150), the HPE 122 updates a copy of the memory line of information 184 (either in the memory subsystem 123 initially or a local cache initially and the memory subsystem 123 subsequently) (step 1152). HPE 122 then updates the state of the memory line of information 184 in the directory 180 to indicate that both the requesting node 102, 104 and the former owner node 102, 104 are both storing a shared copy of the memory line of information 184 (step 1154). The HPE 122 also updates the state of any entries 210 in the TSRF 202 for a request relating to the memory line of information 184 and received while waiting for the share write-back to indicate that the associated memory transaction may be executed. The HPE 122 then removes the entry 210 in the TSRF 202 related to this memory transaction (step 1155).

Upon receiving the read response (whether sent by the home node 102, 104 or an owner node 102, 104) (step 1156), the RPE 124 forwards the shared copy of the memory line of information 184 to the PC 106 that initiated the memory transaction (step 1158). The RPE also removes the entry 210 in the TSRF 202 related to the memory transaction (step 1160).

The read request steps described above with reference to FIGS. 11A–11E are subject to an optimization in preferred embodiments of the present invention. Specifically, if the memory line of information requested by the requesting node 102, 104 is not shared or owned by any nodes 102, 104, the HPE 122 returns an exclusive copy of the memory line of information 184. In other words, the response to a request for a shared copy of the memory line of information 184 is "upgraded" from a read reply to a read-exclusive reply. Thus, the requesting node 102, 104 is identified in the directory 180 as exclusive owner of the memory line of information. However, this optimization does not affect the home node's 102, 104 response to a request for a memory line of information that is comprised of an instruction since an instruction is never written to by a requesting node. Thus, there is no reason to provide an exclusive copy.

Figure 12A:
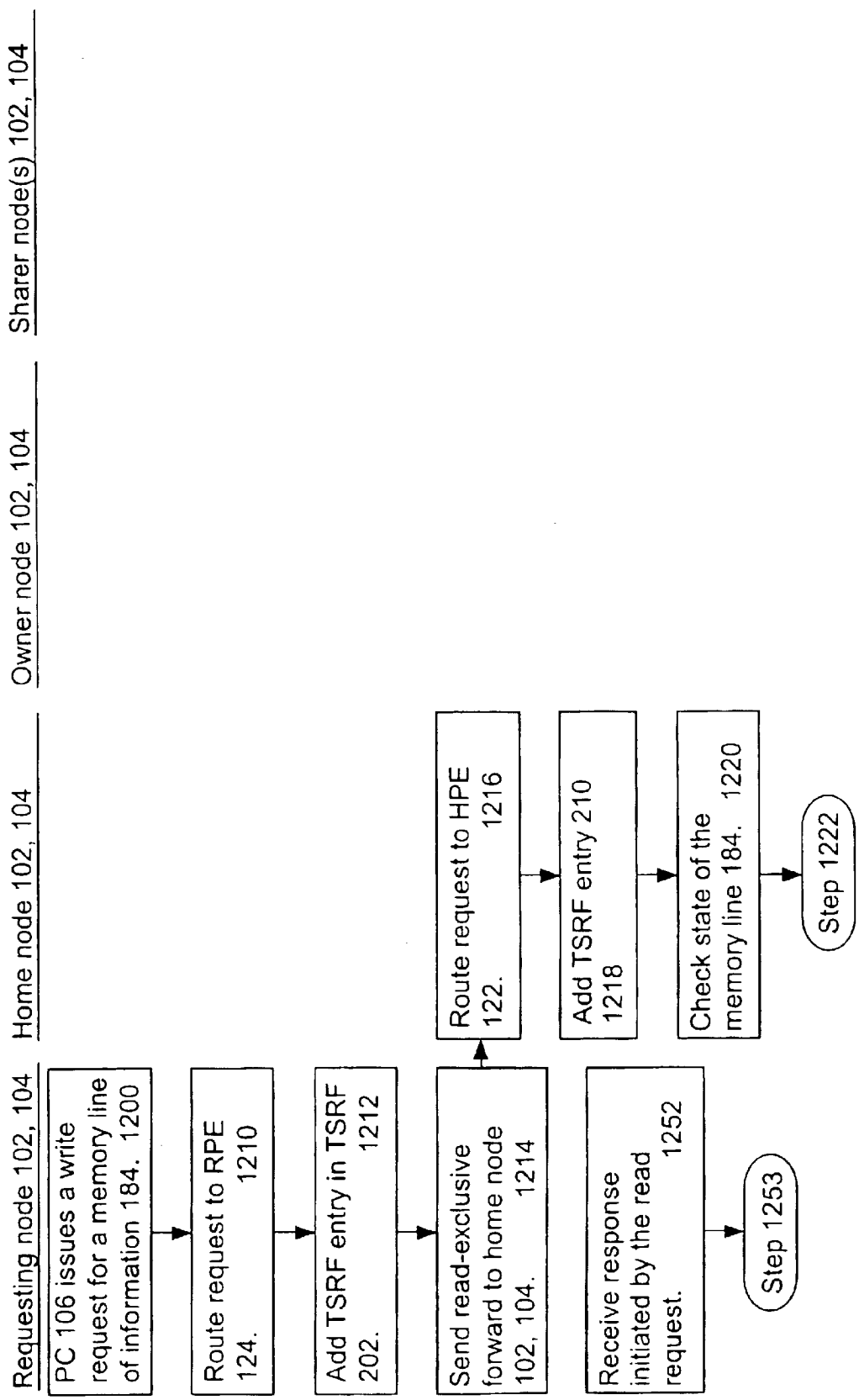
FIGS. 12A, 12B, 12C and 12D illustrate the exchange of protocol messages in the course of a write request.

FIG. 12A illustrates steps executed to satisfy a request for an exclusive copy of a specified memory line of information 184, which permits the node 102, 104 requesting the memory line of information 184 (i.e., requesting node) to modify the memory line of information 184. In a first step, a PC 106 issues the request for an exclusive copy of the memory line of information 184 (step 1200). The request is routed to the RPE 124 (step 1210), which adds an entry 210 in the TSRF 202 (step 1212). The new entry 210 indicates that a read-exclusive reply and a number (zero or more) of invalidation acknowledgments are required to advance the state of this memory transaction. The RPE 124 then sends a read-exclusive request to the home node (step 1214). At this point the memory transaction in the RPE 124 enters the Waiting state, where it remains until it receives the aforementioned read-exclusive reply and (zero or more) invalidation acknowledgments. When these messages are received by the RPE 124, the memory transaction it will made Active and then Running in order to receive and process these protocol messages so as to advance and complete the memory transaction. The new entry 210 also indicates that until the aforementioned replies are received, incoming requests related to the memory line of information 184 are stalled, which means that a TSRF entry 210 is added to the TSRF 202 for the incoming requests. Once the aforementioned replies are received, the state of the TSRF entry 210 is updated by the RPE 124 so that these incoming requests are processed.

The read-exclusive request is received by the home node 102, 104, and routed to the HPE 122 (step 1216) of the home node, which adds an entry 210 in the TSRF 202 (step 1218). The HPE 122 then checks the state of the specified memory line 184 in a corresponding entry 182 in the directory 180 (step 1220). At this time, the HPE also sends a request to the L2 cache to locate and invalidate any copies of the specified memory line that may be present on the home node. The L2 cache uses the information in its L2 tag array and DTag arrays to determine if any copies of the specified memory line are present in the L2 cache or any of the L1 caches in the home node. If a copy of the specified memory line is found in the L2 cache, it is invalidated by the L2 cache, and if a search of the DTag arrays locates any copies of the specified memory line in the home node's L1 caches a command message is sent by the L2 cache to the identified local L1 cache or caches instructing those L1 caches to invalidate their copies of the specified memory line. Each L1 cache that receives the invalidate command respond to this command by setting the state of the corresponding cache line to "invalid". It should be noted that when the requestor for exclusive ownership of the specified memory line is a processor core in the home node of the memory line, L2 cache invalidates all cached copies of the specified memory line except for the copy (if any) held by the L1 cache of the requesting processor.

Figure 12B:
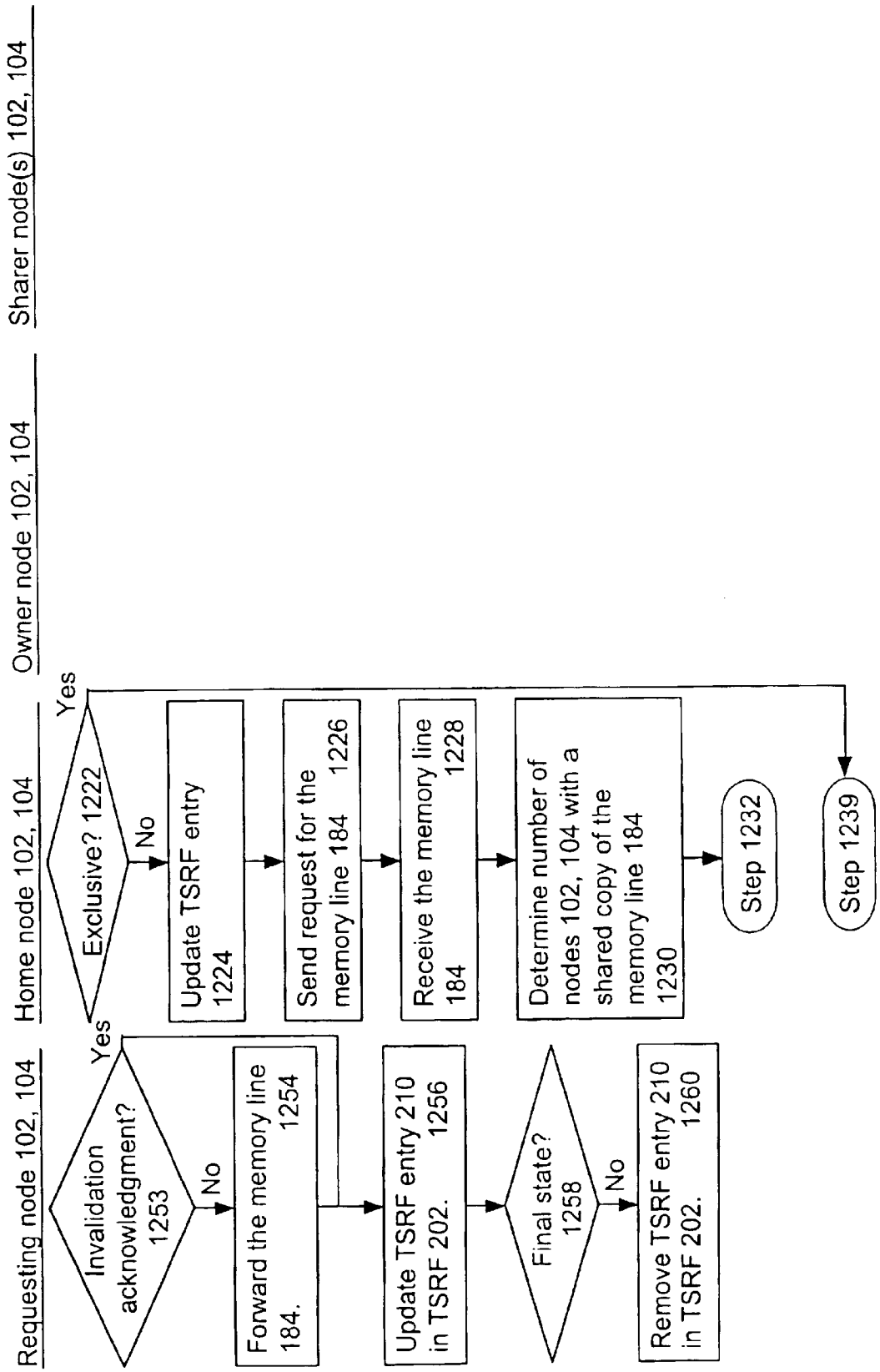
Figure 12C:
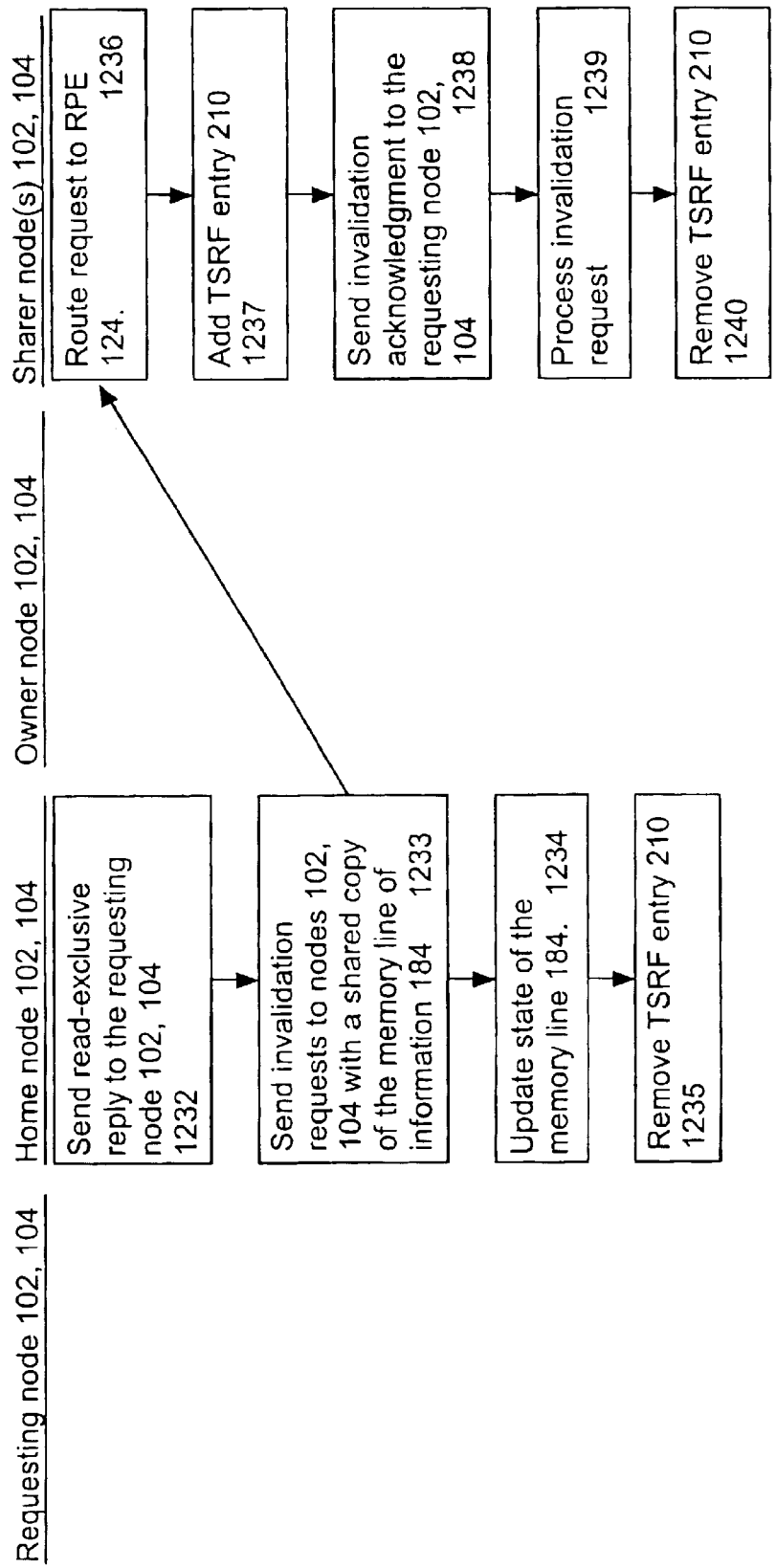
Figure 12D:
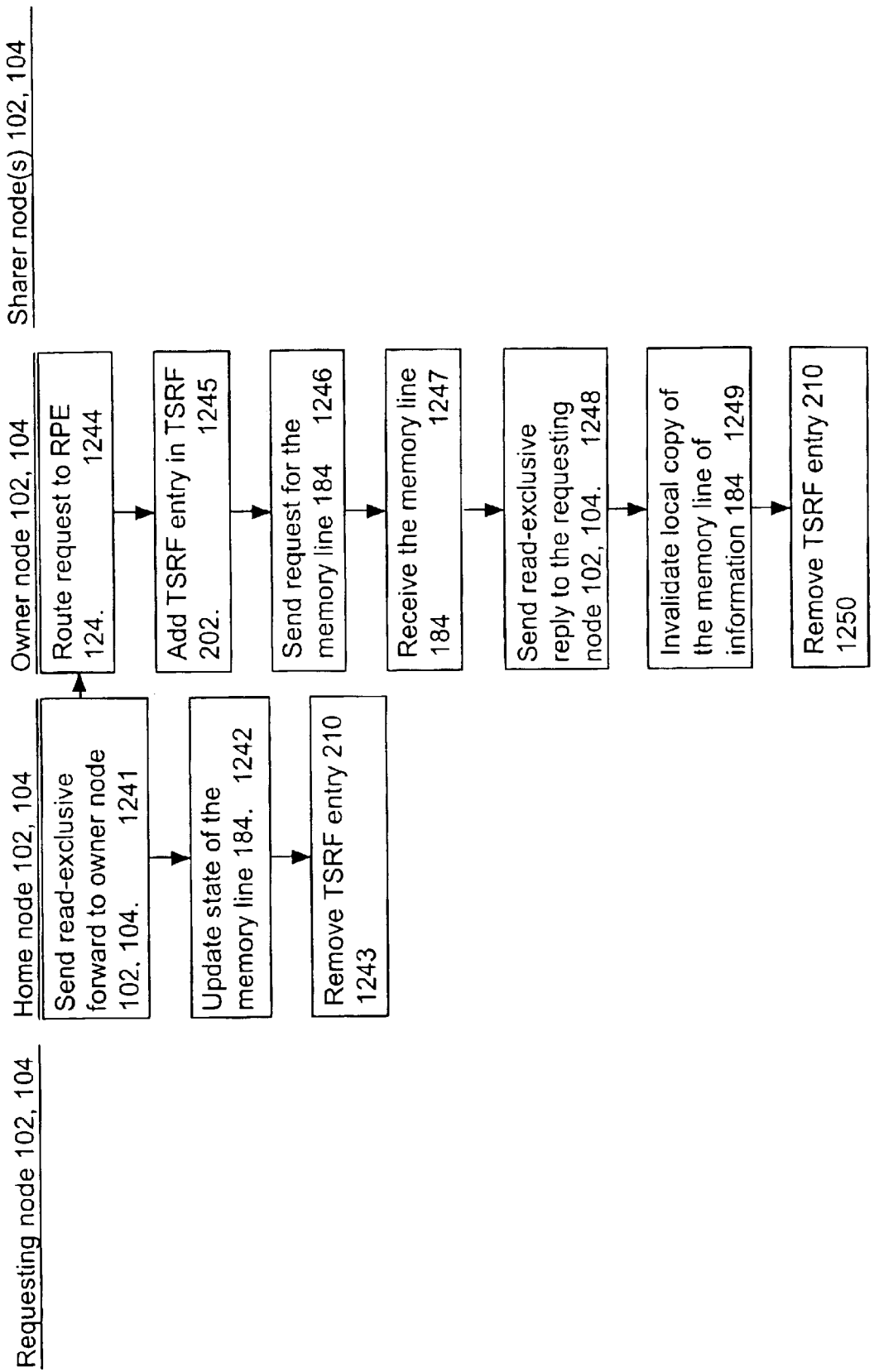

If the directory entry 182 for the specified memory line does not indicate that a node 102, 104 has an exclusive copy of the memory line of information 184 (FIG. 12B, step 1222-No), the HPE 122 updates the entry 210 in the TSRF 202 to indicate that the memory transaction requires an internal response to a request for the memory line of information 184 in order to advance to another state (step 1224). The HPE 122 then sends a request for the memory line of information 184 from the memory subsystem 123 (step 1226). Upon receiving the memory line of information 184 (step 1228), the HPE 122 determines the number of nodes 102, 104 that have a shared copy of the memory line of information by reference to an entry 182 in the directory 180 corresponding to the memory line of information 184 (step 1230).

The HPE 122 then sends a read-exclusive reply to the requesting node 102, 104 (step 1232). The read-exclusive reply includes a copy of the memory line of information and indicates the number of invalidation acknowledgments to expect. HPE 122 then sends an invalidation request to each node 102, 104, if any, that has a shared copy of the memory line of information 184 (step 1233). The BPE uses the information in the directory entry for the memory line to identify the nodes having a shared copy of the memory line. HPE 122 then updates the state of the memory line of information 184 in the directory 180 to indicate that the requesting node 102, 104 is an exclusive owner of the memory line of information (step 1234) and removes the TSRF entry 210 in the TSRF 202 related to this memory transaction (step 1235). Thus, from the perspective of the home node 102, 104, the entire memory transaction (including activity at other nodes 102, 104) is now complete, though other nodes 102, 104 must process protocol messages relating to this memory transaction.

The invalidation request is received by the sharer node(s) 102, 104, and routed to the RPE 124 (step 1236) in each of those nodes, which respond by adding an entry 210 to the TSRF 202 (step 1237). The RPE 124 responds initially by sending an invalidation acknowledgment to the requesting node 102, 104 (step 1238). Additional steps taken by the RPE 124 depend upon whether the RPE is waiting on any requests related to the same memory line of information 184 (step 1239). See the discussion below, in the section entitled "Limited Fanout Daisy-Chaining Invalidation Requests," for a description of another methodology of sending and handling invalidation requests and acknowledgments.

If the RPE 124 is waiting for a response to a read request, the invalidation request is merged with the outstanding read request transaction. To do this the RPE updates the TSRF entry 210 corresponding to the outstanding read request to indicate that an invalidation request related to the same memory line of information 184 has been received. Once the response to the read request is received, the PC 106 that initiated the read request/memory transaction is given a read-once copy of the memory line of information. In other words, the PC 106 is not permitted to cache a copy of the memory line of information 184. This situation (receiving an invalidation request while waiting for a response to a read request) occurs because the CCP does not order protocol messages. More specifically, the home node 102, 104 received the read request and sent a response to the read request before receiving the read-exclusive request and sending the invalidation request, but the invalidation request is received before the response.

If the RPE 124 is waiting for a response to a read-exclusive request or an exclusive request, the invalidation request is acknowledged as noted above and no additional steps are taken (e.g., there is no limitation to a read-once copy).

Once these additional steps are complete, the RPE 124 removes the TSRF entry 210 related to this memory transaction (step 1240).

If the directory entry 182 indicates that a node 102, 104 has an exclusive copy of the memory line of information 184 (step 1222-Yes), the HPE 122 sends a "read-exclusive forward" message to the owner node 102, 104 (step 1241), updates the state of the memory line of information 184 in the directory 180 to indicate that the requesting node 102, 104 is exclusive owner of the memory line of information 184 (step 1242), and removes the TSRF entry 210 in the TSRF 202 related to this memory transaction (step 1243). Thus, from the perspective of the home node 102, 104, the entire memory transaction (which includes activity at other nodes 102, 104) is now complete, though other nodes 102, 104 continue to process this memory transaction.

The read-exclusive forward is received by the owner node 102, 104, and routed to the RPE 124 (step 1244). The RPE 124 responds by adding an entry 210 in the TSRF 202 indicating that the memory transaction requires an internal response to a request for the memory line of information 184 in order to advance to another state (step 1245). The RPE 124 then sends a request for the memory line of information 184 from the L1 or L2 cache 110, 114 in which the memory line is locally stored (step 1246). Upon receiving the memory line of information 184 (step 1247), the RPE 124 sends a read-exclusive reply to the requesting node 102, 104 (step 1248). This protocol messages includes an up-to-date copy of the memory line of information 184. The RPE 124 then invalidates the local copy of the memory line of information 184 (step 1249) and removes the entry 210 from the TSRF 202 (step 1250).

When the home node is the owner node, there is no need for the HPE of the owner node to send a read-exclusive forward to the owner node. Instead, the HPE sends a message to the L2 cache requesting that it forward a copy of the specified memory line and that it furthermore invalidate all cached copies of the memory line in the L2 cache and/or the L1 caches in the home node. The HPE would then send the read-exclusive reply message to the requesting node (i.e., steps 1246 through 1250 would be performed by the home node, since it is also the owner node in this example).

Upon receiving the read-exclusive response (step 1252), the steps taken depend upon the content of the response. As noted above, a read-exclusive request can result in a number of invalidation acknowledgments from nodes 102, 104 that have or had a shared copy of the memory line of information 184. Additionally, the CCP does not requires protocol message ordering, so invalidation acknowledgments can arrive at the requesting node before a read-exclusive reply. If the response is an invalidation acknowledgment (step 1253-Yes), RPE 124 updates the TSRF entry 210 in the TSRF 202 associated with this memory transaction to reflect that the invalidation acknowledgment was received (step 1256). More specifically, RPE 124 increments or decrements a counter in the counter fields 226 of the TSRF entry 210.

If the response is not an invalidation acknowledgment (step 1253-No), it is a read-exclusive reply, in which case the RPE 124 forwards the memory line of information 184 included in the reply to the PC 106 that requested the memory line of information (step 1254). If the read-exclusive reply indicates that a number of invalidation acknowledgment are to be received, the reply to the PC 106 also indicates that the memory transaction is not complete (unless the number of invalidation acknowledgments have already been received). RPE 124 then updates the TSRF entry 210 to reflect that the read-exclusive reply has been received and to indicate the number of invalidation acknowledgments, if any, to be received as well (step 1256).

Whether an invalidation acknowledgment or a read-exclusive reply is received, RPE 124 then determines if another protocol message is due (e.g., an invalidation acknowledgment or a read-exclusive reply). If no additional protocol messages are due, (step 1258-Yes), RPE 124 removes the TSRF entry 210 from the TSRF 202 (step 1260). Otherwise, the entry 210 is not removed immediately, but is updated and eventually removed as additional, related protocol messages are received. Additionally, the RPE 124 sends an additional message to the PC 106 to indicate that the memory transaction is complete if the RPE 124 indicated to the PC 106 in its earlier reply that the memory transaction was not complete.

Until the TSRF entry 210 in the TSRF 202 is removed, incoming requests (read, read-exclusive, exclusive protocol messages) related to the memory line of information 184 are merged with the existing TSRF entry 210 related to this memory line of information 184 and put in the Suspended state. Once the read-exclusive reply and all invalidation acknowledgments, if any, are received, the state of the TSRF entry 210 is updated to the Active state so that it will be selected by the scheduler and the merged requests will be processed by the test and execution unit 194.

Additionally, the write request steps described above with reference to FIGS. 12A–12D are subject to an optimization in preferred embodiments of the present invention. Specifically, if the requesting node 102, 104 already has a copy of the memory line of information, the RPE 124 of the requesting node sends an "exclusive request" to the home node 102, 104 instead of a "read-exclusive request." If the requesting node 102, 104 is unambiguously listed as a sharer node 102, 104 in the entry 182 of the directory 180, the steps are the same as those described above with reference to FIGS. 12A–12D, with the exception that the home node 102, 104 does not include the memory line of information 184 with the exclusive reply (a protocol message sent instead of a read-exclusive reply).

A given node is unambiguously listed as a sharer node if the sharer-information field 188 is in the limited-pointer format and includes the identifier of the given node or in coarse-vector format and only the requesting node is associated with a particular set bit. Thus, a given node is not unambiguously listed as a sharer node 102, 104 if (1) the sharer-information field 188 is in the limited-pointer format but does not include the identifier of the given node, or (2) the sharer-information field 188 is in the course-vector format and the bit associated with the given node 102, 104 is also associated with other nodes.

If the requesting node 102, 104 is not unambiguously listed as a sharer node 102, 104 in the entry 182 of the directory 180, the HPE 122 converts the exclusive request to a read-exclusive request, which is then processed as described above. Alternatively, the HPE 122 sends a protocol message to the RPE 124 at the requesting node 102, 104 directing it to send a read-exclusive request to the home node. In another alternate embodiment, the RPE of the requesting node is configured to recognize when the number of nodes in the system is sufficiently great that the coarse vector bit used to represent the requesting node in the sharer information field 188 of directory entries also represents at least one other node. In this alternate embodiment, the RPE of the requesting node is further configured to not send exclusive requests when it recognizes, detects or knows this of this system status, and to instead send a read-exclusive request. In other words, in this situation the "exclusive request" optimization is suppressed or not used.

Figure 13:
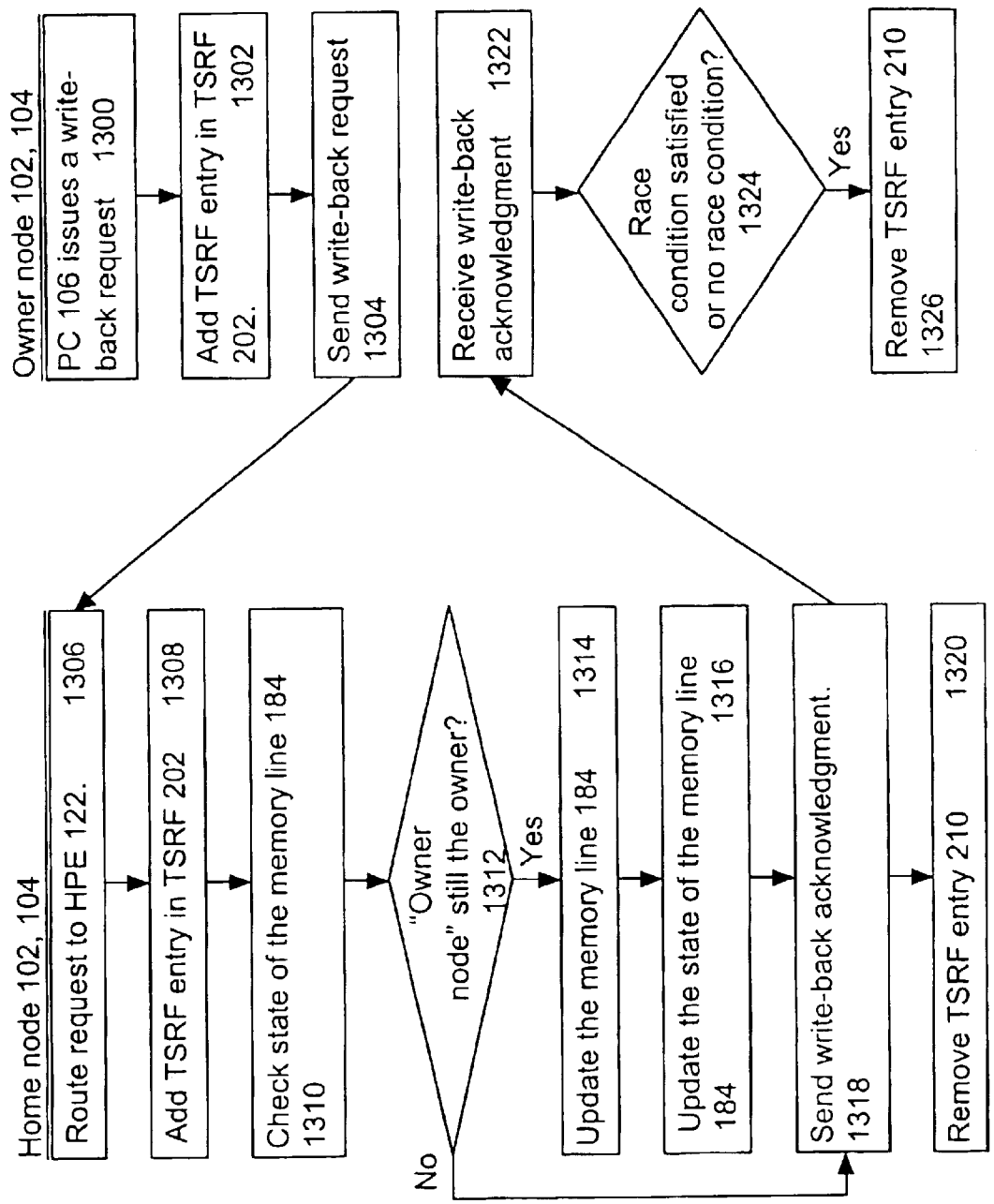
FIG. 13 illustrates the exchange of protocol messages in the course of completing a write-back request.

FIG. 13 illustrates steps taken to support a write-back request protocol message. A write-back request is initiated by a PC 106 when, for example, space is needed in the caches 110, 114 (step 1300). As an exception to the general rule described above, the write-back request is a high-priority protocol message. This exception is required because of a potential for the race condition described below.

The request is routed to the RPE 124, which responds by adding an entry 210 in the TSRF 202 (step 1302) and sending a write-back request to the home node 102, 104 (step 1304).

The entry 210 indicates that a write-back acknowledgment is required to advance the memory transaction to a next state. Additionally, the RPE 124 maintains the memory line of information 184 until the write-back acknowledgment is received and, if necessary, a forwarded request is received. If a forwarded request is received (e.g., read forward), it is handled as described above; however, the RPE 124 updates the state of the TSRF entry 210 to indicate that the forwarded request was received.

Upon being received at the home node 102, 104, the write-back request is routed to the HPE 122 (step 1306) of the home node, which responds by adding an entry 210 in the TSRF 202 (step 1308). HPE 122 responds by checking the state of the memory line (step 1310). In particular, the HPE 122 determines if the directory entry 182 corresponding to the memory line of information still indicates that the "owner" node 102, 104 is the owner of the memory line of information 184. If so (step 1312-Yes), the HPE 122 updates the memory line of information 184 in the memory subsystem 123 (step 1314) and the state of the associated directory entry to indicate that the memory line of information 184 is no longer shared or owned by the former owner node 102, 104 (step 1316). HPE 122 then sends a write-back acknowledgment to the former owner node 102, 104 indicating that the memory transaction was successful (step 1318). The HPE then removes the TSRF entry 210 related to this memory transaction (step 1320).

If the directory entry 182 corresponding to the memory line of information does not indicate that the "owner" node 102, 104 is the owner of the memory line of information 184 (step 1312-No), HPE 122 sends a write-back acknowledgment to the former owner node 102, 104 indicating that the write-back request was stale (i.e., that the memory transaction was not successful) (step 1318). More specifically, the write-back acknowledgment indicates that the home node 102, 104 forwarded a request related to the memory line of information 184 to the former owner node 102, 104 before receiving the write-back request. The HPE then removes the TSRF entry 210 related to this memory transaction (step 1320).

Upon receiving the write-back acknowledgment (step 1324), the RPE 124 of the former owner node determines if a race condition exists and whether it has been satisfied. As noted above, the write-back acknowledgment will indicate whether a race condition exists (i.e., whether the home node has forwarded a request related to the memory line that is the subject of the write-back request). The TSRF entry 210 in the RPE of the former owner node will indicate if the forwarded request has already been received and processed by the former owner node 102, 104. If so, the RPE 124 removes the TSRF entry 210 for the memory transaction (step 1326). If not, the RPE 124 updates the state of the TSRF entry 210 to indicate that the forwarded request is required in order to advance the state of the memory transaction to a final state, and thus remove the TSRF entry 210.

Limited Fanout Daisy-Chaining Invalidation Requests

In the above described embodiments, the home node 102, 104 always sends invalidation requests to sharer nodes 102, 104 individually. Each sharer node 102, 104 then sends an invalidation acknowledgment to the requesting node 102, 104. Accordingly, the maximum number of invalidation requests and invalidation acknowledgments is entirely dependent upon the number of nodes 102, 104 sharing a given memory line of information 184 and bound only by the number of nodes 102, 104 in the multiprocessor system 100. To reduce the number of protocol messages (e.g., invalidation requests and invalidation acknowledgments) active at any given moment, the invention configures directory entries (see FIG. 4 and the above discussion of the directory data structure 180) using the above described limited-pointer format and coarse-vector format, and furthermore employs a limited fanout, daisy-chaining invalidation methodology that ensures that no more than a specified number of invalidation requests and invalidation acknowledgments are active at any given moment, which avoids deadlocks.

The maximum number of invalidation requests and acknowledgments, resulting from a request for exclusive ownership of a particular memory line, that are active at any given moment is herein called the maximum fanout. In the preferred embodiments, the maximum fanout is a number between four and ten. The protocol engines of the present invention are configured to ensure that the number of invalidation requests and/or acknowledgments simultaneously active in a system as a resulting of a single a request for exclusive ownership of a particular memory line never exceeds the maximum fanout.

In preferred embodiments, the maximum number of invalidation requests and invalidation acknowledgments is set to four. Thus, the sharer-information field 188 of each directory entry 182 (FIG. 4) is configured to identify a maximum of DP (e.g. four) nodes when using the limited-pointer format. Similarly, the bits (e.g., 40-bits) of the sharer-information field 188 are grouped into DP (e.g., four) groups (e.g., 10-bit groups) when in the coarse-vector format. While the operation of the invention will be described with respect to an embodiment in which the sharer-information field 188 contains four groups of 10-bits for a total of 40 bits, in other embodiments the total number of bits in the sharer-information field, the number of groups of bits, and the number of bits per group, may vary substantially from those used in the preferred embodiment.

As described in more detail below, the home node 102, 104 sends at most one invalidation request for each of the four 10 bit groups. In particular, the home node sends an invalidation request to the first node, if any, identified as being a potential sharer by each 10-bit group within the sharer-information field. Thus, a home node 102, 104 sends at most four invalidation request messages to other nodes. Further, a subsequent set of invalidation request messages, if needed, are sent by the nodes that receive the initial invalidation request messages, this time to the second node, if any, identified as being a potential sharer by each respective 10-bit group within the sharer-information field. This process is repeated by each node receiving an invalidation request until the last node identified as being a potential sharer by each respective 10-bit group within the sharer-information field has received an invalidation request. Only the last identified node for each respective 10-bit group sends an invalidation acknowledgment to the requesting node 102, 104. Using this limited fanout, daisy chaining-like methodology, the maximum number of invalidation request messages and invalidation acknowledgment messages that are active at any one time as the result of a request for exclusive ownership of a particular memory line never exceeds four, which is the maximum fanout in a preferred embodiment. In other preferred embodiment, the maximum fanout varies from four to ten.

In some embodiments of the present invention, the bits are grouped, for example, as follows: the first 10-bits, the second 10-bits, the third 10-bits, and the fourth 10-bits of a 40-bit sharer-information field 188 are groups 1–4 respectively. But in preferred embodiments of the invention, the bits within each group are interleaved. Specifically, in the preferred embodiment, the bits (and table 189 columns) 0, 4, 8, 12, 16, 20, 24, 28, 32, and 36 form one group; bits (and table 189 columns) 1, 5, 9, 13, 17, 21, 25, 29, 33, and 37 form a second group; bits (and table 189 columns) 2, 6, 10, 14, 18, 22, 26, 30, 34, and 38 form a third group; bits (and table 189 columns) 3, 7, 11, 15, 19, 23, 27, 31, 35, and 39 form a fourth group.

Though group identifiers (e.g., first group, second group, etc.) are not required for a node 102, 104 to determine which group it is in (since each node 102, 104 has access to its identifier) the number of bit groups and the number of bits in the sharer-information field 188 are required to establish the bit membership of each group (i.e., to determine the position of the bits of a given group within the sharer-information field 188) or equivalently, to establish the identity of a first node 102, 104 associated with each bit and additional nodes 102, 104 associated with each bit of a given group.

Figure 14A:
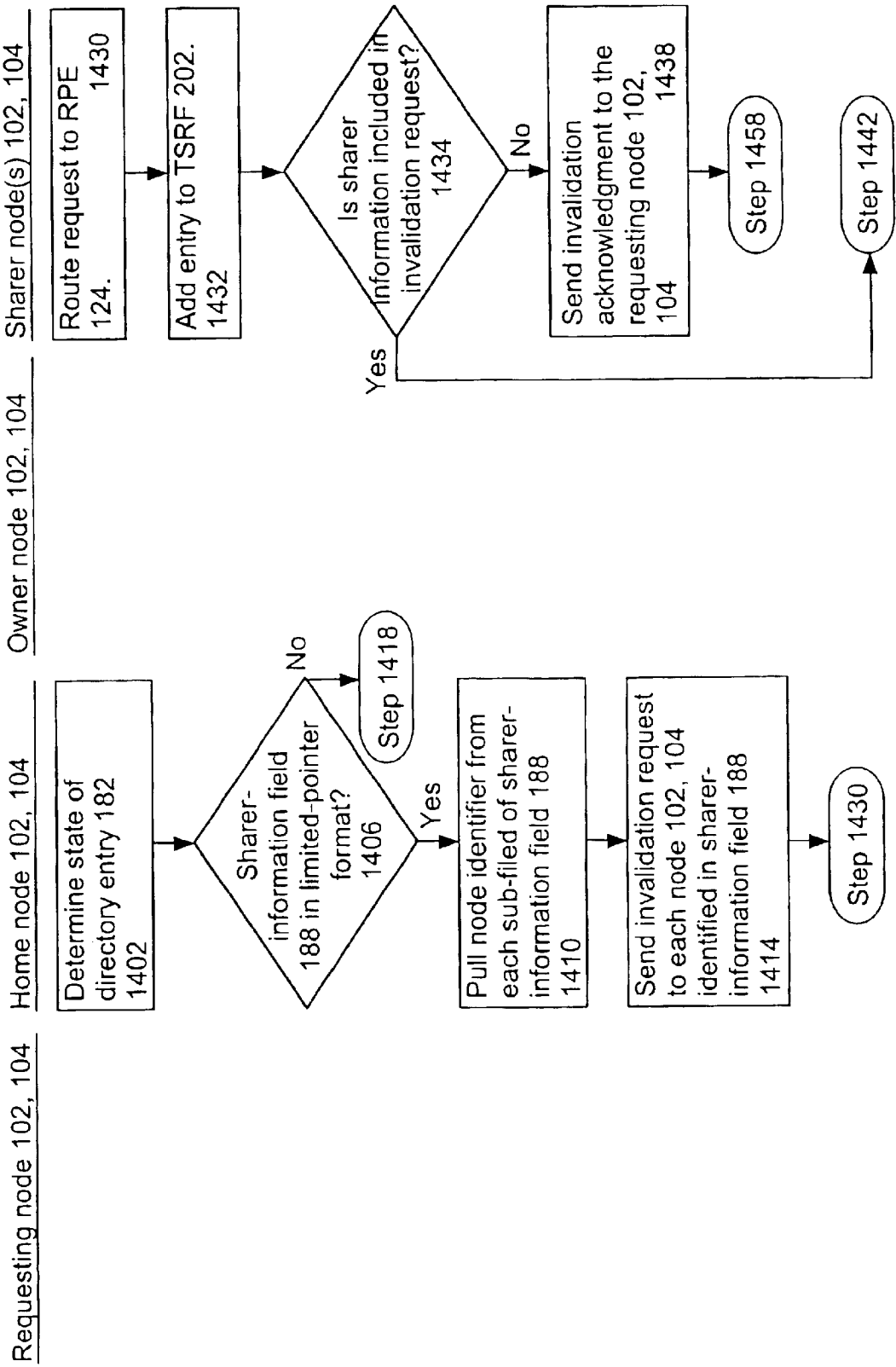
FIGS. 14A and 14B illustrate the exchange of protocol messages in the course of executing an invalidation request when nodes are represented in a limited-pointer format or a coarse-vector format.
Figure 14B:
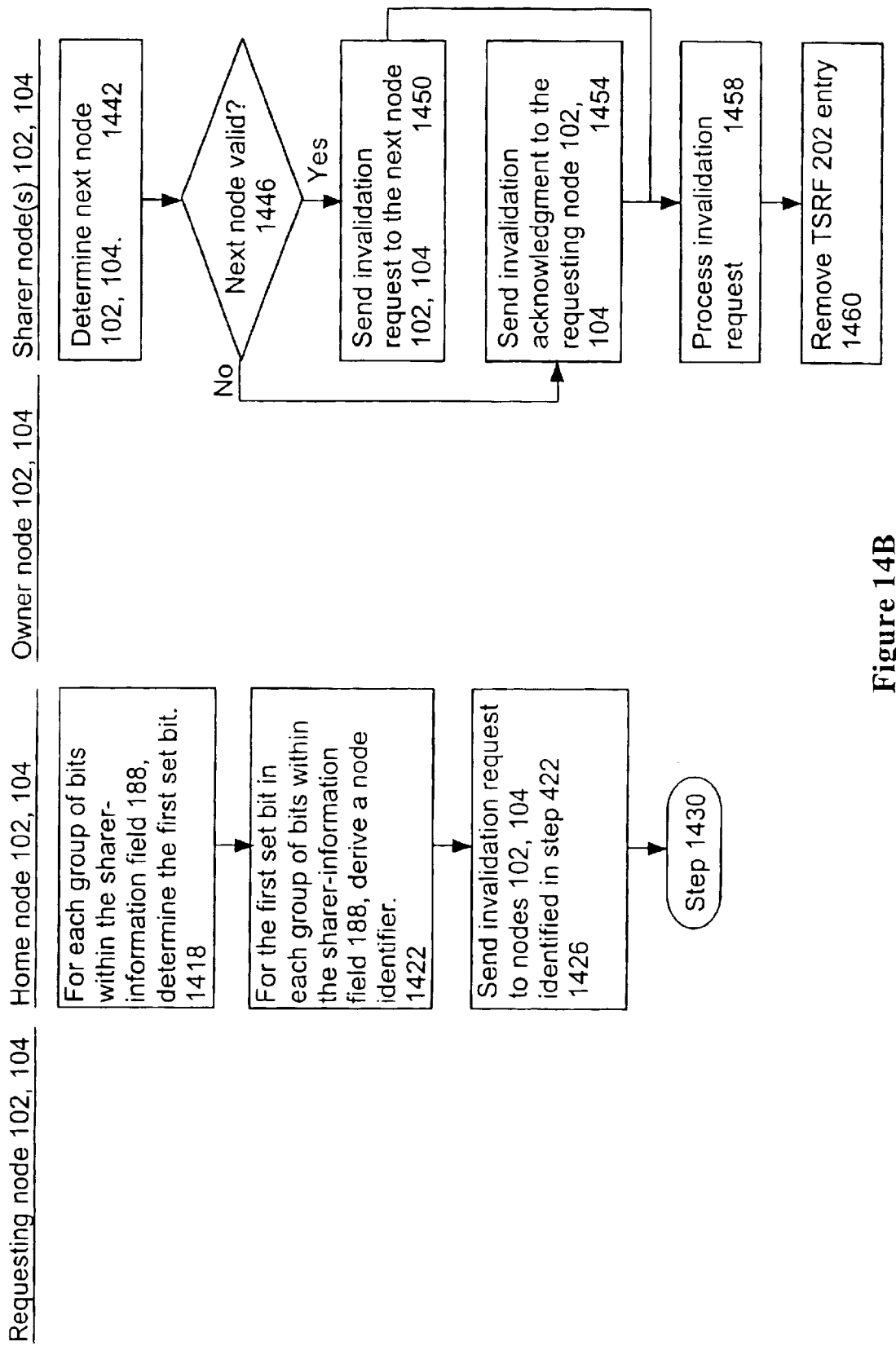

This aspect of the invention is now described in greater detail with reference to FIGS. 14A and 14B. The steps taken by the home node 102, 104 before and after an invalidation request is sent to a sharer node 102, 104 as described above are not changed in this embodiment of the invention.

In a first step, the home node 102, 104 determines the state of a given memory line of information 184 by reference to a corresponding directory entry 180 (step 1402). As described above, each directory entry 180 includes a state field 186, which is preferably set to one of four values—including invalid, exclusive, shared, and shared-cv. Accordingly, this determination is made by reference to the state field 186. If the state field 186 is set to shared, the format of the sharer-information field 188 is the limited-pointer format. If, however, the state field is set to shared-cv, the format of the sharer-information field 188 is the coarse-vector format.

If the state field 186 indicates that the sharer-information field 188 is in the limited-pointer format (step 1406-Yes), the home protocol engine 122 extracts the node identifiers directly from each of the four sub-fields of the sharer-information field 188 (step 1410). The node identifier in each sub-field is valid if it is not the predefined null identifier. As noted above, in preferred embodiments the null identifier value is zero. The home protocol engine 122 then sends an invalidation request to each node 102, 104 identified in the sharer-information field 188 as a sharer node 102, 104 (step 1414).

If, however, the state field 186 indicates that the sharer-information field 188 is in the coarse-vector format (step 1406-No), the home protocol engine 122 identifies for each group of bits within the sharer-information field 188 the first set bit (step 1418). Note that it is possible that one or more the groups may have no bits that are set.

Once the first set bit, if any, in each group of bits is identified, the home protocol engine 122 identifies the first node 102, 104 that corresponds to each of the identified first-set-bits using the techniques described above (step 1422). The above described techniques are extended somewhat in preferred embodiments however. If the first node 102, 104 that corresponds to a given identified first-set-bit is the requesting node or the home node, the home protocol engine 122 identifies the second node 102, 104 that corresponds to the identified first-set-bit. This step is repeated until a node 102, 104 that is neither the home node nor the requesting node is identified. If it is determined that none of the set bits in the group correspond to a node other than the home node and requesting node, an invalidation request is not sent by the home node for this particular group of bits in the sharer-information field 188. In alternative embodiments, this step is not taken by the home node 102, 104. Instead, the HPE 122 of the home node and the RPE 124 of the requesting node are configured to process these messages as described above without ever responsively invalidating the memory line of information 184.

Once one or more nodes 102, 104 are identified (i.e., up to one node per group of bits in the sharer-information field of the directory entry), the home protocol engine 122 sends an invalidation request to each of the identified nodes 102, 104 (step 1426). Included each invalidation request is a sharer group field containing the 10-bit group of bits associated with the designated recipient of a given invalidation request and possibly an identifier of the 10-bit group. (The sharer group field is not included in an invalidation request if the sharer-information field 188 is not in the coarse-vector format.) This sharer group field is required because the sharer nodes do not maintain information about the nodes 102, 104 that share a given memory line of information 184. The 10-bit group of sharer information that is sent along with the invalidation request permits each node that receives the invalidation request to identify the next node 102, 104 to receive an invalidation request as described above or to determine that there is no next node 102, 104 (i.e., that an invalidation acknowledgment should be sent to the requesting node 102, 104).

Additionally, the group identifier of the 10-bit group permits the sharer node 102, 104 to identify the position of each bit within the 10-bit group in the sharer-information field 188, which also permits the sharer node 102, 104 to identify the next node 102, 104 (if any) to receive the invalidation request, as described above, or to determine that there is no next node 102, 104. In an alternate embodiment, the group identifier is not included in the invalidation request and instead the protocol engines in each node are programmed to know the sharer group in which each such node resides. Since all the invalidation requests received by any particular node would always have the same sharer group identifier, the sharer group identifier is not strictly needed.

Upon receiving an invalidation request (step 1430) and adding a related entry 210 in the TSRF 202 (step 1432), a sharer node 102, 104 determines a next node, if any, by analyzing the sharer group field of the invalidation request. If all of the bits of the sharer group field are set to zero, there is no sharer information in the request (1434-No) and therefore there is no next node to which to send the invalidation request. Instead, the remote protocol engine 124 in the sharer node 102, 104 sends an invalidation acknowledgment to the requesting node (step 1438). The sharer-node then processes the invalidation request as described above with reference to step 1238 (step 1458).

If the sharer group field in the received invalidation request includes any set bits (i.e., includes sharer information) (step 1434-Yes), the remote protocol engine 124 in the sharer node 102, 104 determines the next node, if any, to receive an invalidation request (step 1442). The remote protocol engine in the sharer node identifies the next node by first determining the bit in the sharer group field that corresponds to the node identifier of the sharer node, and then determining if there is a next node (e.g., with a higher node identifier) that (A) also corresponds to that same bit of the sharer group field, and (B) is neither the home node (which is identified by the address of the memory line to be invalidated) nor the requesting node (which is identified by a requesting node field in the invalidation request). If not, the remote protocol engine looks for a next set bit (if any) in the sharer group field and determines if that next set bit corresponds to a node 102, 104 that is neither the home node 102, 104 nor the requesting node 102, 104. This process continues, processing the bits of the sharer group field in a predetermined order (e.g., from left to right) until the remote protocol engine either identifies a next node, or determines that there is no next node.

If a valid next node 102, 104 is identified (step 1446-Yes), the sharer node 102, 104 sends an invalidation request to the next node (step 1450). The sharer node 102, 104 includes in this invalidation request the same 10-bit sharer group field (and possibly a group identifier) that was included in the invalidation request received by the sharer node 102, 104. The sharer node 102, 104 then processes the invalidation request as described above with reference to step 1238 (step 1458). The sharer node 102, 104 then removes the related entry 210 from the TSRF 202 (step 1460).

If, a valid next node is not identified (step 1446-No), this means that the sharer node is the last node in the invalidation request daisy chain. In this case the sharer node sends an invalidation acknowledgment to the requesting node (step 1454). The sharer node then processes the invalidation request as described above with reference to step 1238 (step 1458). The sharer node 102, 104 then removes the related entry 210 from the TSRF 202 (step 1460).

Because each of the bits of the sharer group field may be associated with more than one nodes, the remote protocol engines in the nodes of the system are unable to determine which of the associated nodes (other than itself) are actually sharer nodes. When a node receives an invalidation request for a memory line of information 184 that it does not share, the node nevertheless sends an invalidation request (step 1450) or acknowledgment (step 1454) as described above. However, the processing of the received invalidation request at step 1458 comprises determining that the node is not a sharer of the specified memory line, and therefore no cache lines in the node are invalidated in response to the received invalidation request.

In other preferred embodiments, the bits of the sharer information field of the directory entries are divided into a larger number of groups of bits (e.g., four to ten groups). The number of such groups of bits corresponds to the maximum fanout of the daisy chained invalidation messages in these embodiments.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer system, comprising:
an interconnect;
a plurality of processor nodes, coupled to the interconnect, each processor node comprising at least one processor core, each processor core having an associated memory cache for caching memory lines of information;
a plurality of input/output nodes coupled to the interconnect; and
wherein the processor nodes and the input/output nodes collectively comprise a plurality of system nodes, each of which comprises
input logic that receives a first invalidation request, the invalidation request identifying a memory line of information and a patten of bits that identify a subset of the plurality of system nodes that potentially store cached copies of the identified memory line; and
processing circuitry that, responsive to receipt of the first invalidation request, determines a next node identified by the pattern of bits in the invalidation request and sends to the next node, if any, a second invalidation request corresponding to the first invalidation request, and that invalidates a cached copy of the identified memory line, if any, in the particular node of the computer system.

2. The system of claim 1 wherein the system is reconfigurable so as to include any ratio of processor nodes to input/output nodes so long as a total number of processor nodes and input/output nodes does not exceed a predefined maximum number of nodes.

3. The system of claim 1 wherein each processor node and input/output node further comprises a protocol engine implementing a predefined cache coherency protocol, wherein the protocol engine of each processor node is functionally identical to the protocol engine of each input/output node.

4. A computer system, comprising:
   a plurality of multiprocessor nodes, each multiprocessor node comprising
      a multiplicity of processor cores, each processor core having an associated memory cache for caching memory lines of information;
   a plurality of input/output nodes coupled to the plurality of multiprocessor nodes; and
   wherein the multiprocessor nodes and the input/output nodes collectively comprise a plurality of system nodes, each of which comprises
      input logic that receives a first invalidation request, the invalidation request identifying a memory line of information and a pattern of bits for identifying a subset of the plurality of system nodes that potentially store cached copies of the identified memory line; and
      processing circuitry that, responsive to receipt of the first invalidation request, determines a next node identified by the pattern of bits in the invalidation request and for sending to the next node, if any, a second invalidation request corresponding to the first invalidation request, and that invalidates a cached copy of the identified memory line, if any, in the particular node of the computer system.

5. The system of claim 4 wherein the system is reconfigurable so as to include any ratio of multiprocessor nodes to input/output nodes so long as a total number of multiprocessor nodes and input/output nodes does not exceed a predefined maximum number of nodes.

6. The system of claim 4 wherein each multiprocessor node and input/output node further comprises a protocol engine implementing a predefined cache coherency protocol, wherein the protocol engine of each multiprocessor node is functionally identical to the protocol engine of each input/output node.

* * * * *